(12) United States Patent
Van Dyne

(10) Patent No.: US 8,286,926 B1
(45) Date of Patent: Oct. 16, 2012

(54) COLLAPSIBLE LEG ASSEMBLY

(76) Inventor: Trace Eugene Van Dyne, Sunbury, OH (US)

( * ) Notice: Subject to any disclaimer, the term of this patent is extended or adjusted under 35 U.S.C. 154(b) by 0 days.

(21) Appl. No.: 13/307,264

(22) Filed: Nov. 30, 2011

(51) Int. Cl.
*F16M 11/38* (2006.01)
(52) U.S. Cl. .......................... 248/166; 248/165; 248/169
(58) Field of Classification Search .................... 38/103; 248/439, 166, 163.1, 188.1, 188, 440.1, 432
See application file for complete search history.

(56) References Cited

U.S. PATENT DOCUMENTS

| | | | |
|---|---|---|---|
| 1,152,987 A * | 9/1915 | Spalding | 108/118 |
| 3,704,850 A | 12/1972 | Hendrickson et al. | |
| 4,927,128 A | 5/1990 | O'Brian | |
| 5,479,852 A | 1/1996 | Lloyd | |
| 5,522,642 A | 6/1996 | Herzog | |
| 5,562,052 A | 10/1996 | Glashouwer et al. | |
| 5,956,807 A | 9/1999 | Kuo | |
| 6,000,345 A | 12/1999 | Gillotti | |
| 6,032,914 A | 3/2000 | Bastida | |
| 6,141,828 A | 11/2000 | Kuo | |
| 6,263,895 B1 | 7/2001 | Bang | |
| 6,347,432 B1 | 2/2002 | Kuo | |
| 6,401,631 B1 | 6/2002 | Kane | |
| 6,467,739 B1 | 10/2002 | Jou | |
| 6,551,226 B1 | 4/2003 | Webber et al. | |
| 6,719,257 B1 | 4/2004 | Greene et al. | |
| 6,868,583 B2 | 3/2005 | Kuo | |
| 6,920,834 B1 | 7/2005 | Pehta et al. | |
| 7,055,847 B2 * | 6/2006 | Miller et al. | 280/638 |
| 7,445,398 B2 | 11/2008 | Stockler | |
| RE40,657 E | 3/2009 | Suh | |
| 7,503,266 B2 | 3/2009 | Carter | |
| 7,677,184 B2 | 3/2010 | Dhanoa et al. | |
| 7,685,750 B2 | 3/2010 | Voitchovsky | |
| 7,757,999 B2 * | 7/2010 | Zhang | 248/166 |
| 7,849,789 B1 | 12/2010 | Whelan | |
| 7,980,519 B2 | 7/2011 | Chen | |
| 2007/0039524 A1 | 2/2007 | Pearson | |

* cited by examiner

*Primary Examiner* — Amy J Sterling
(74) *Attorney, Agent, or Firm* — The Law Office of Patrick F. O'Reilly III, LLC

(57) ABSTRACT

A collapsible leg assembly configured to elevate an object above a floor surface includes at least one pair of leg members, each of the leg members including an inner tubular member telescopically received within an outer tubular member; an attachment member operatively connecting a first of the outer tubular members to a second of the outer tubular members, thereby establishing a pivotal axis about which the leg members are capable of rotating relative to one another; and at least one pair of latching devices, each of the latching devices being configured to selectively prevent the relative sliding movement of one of the inner tubular members relative to its respective outer tubular member. In one or more embodiments, the attachment member and the pivotal axis defined thereby are disposed at a fixed location along the length of each of the outer tubular members between the first and second ends thereof.

20 Claims, 6 Drawing Sheets

COLLAPSIBLE LEG ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to collapsible leg assemblies. More particularly, the invention relates to a collapsible leg assembly comprising at least one pair of leg members arranged in a scissors-like configuration, each of the leg members having an inner tubular member telescopically received within an outer tubular member.

2. Background and Description of Related Art

Conventional folding support structures are known that have pivotal legs that fold up against the bottom of a tabletop or another object supported thereby. The foldable nature of these support structures facilitates the more compact storage of these devices, as well as the portability of these devices. Typically, folding support structures have legs that bend on a hinge located at the connection point between the object (e.g., tabletop) and each respective leg. Each leg is designed to fold and fit securely against the underside of the tabletop or other object, while remaining attached thereto. Conventional folding support structures are produced in a wide variety of different sizes, configurations, and designs. Also, they are formed using many different materials, such as various metals and wood.

Folding support structures are widely used in many diverse applications. For example, folding support structures are commonly found in tables, keyboard stands, and in many other devices that require portability and compact storage. When incorporated in tables, folding support structures enable the table to be easily used for a particular period of time (e.g., during a certain function), and then, subsequently removed, transported, and possibly stowed, after the event is over.

While conventional folding support structures may offer a reduction in storage size, and some portability, these devices have numerous limitations and drawbacks. First, many conventional folding support structures are not sufficiently stable, especially when positioned on uneven floor surfaces, and thus are too susceptible to tipping over and wobbling. Secondly, related art support structures generally are quite cumbersome to set up and take down, thereby resulting in an excessive expenditure of labor by the users thereof. Also, conventional folding support structures either offer no provisions for height adjustment at all, or if height adjustment is included in the structure, the height adjustment mechanisms employed do not afford sufficient adjustability and ease of use. In addition, conventional folding support structures are generally incapable of folding substantially flat, and thus occupy too much space during transportation and storage. Finally, when utilized in a table assembly, conventional folding support structures with four legs disposed in respective corners of the tabletop typically encroach upon the leg space that is available to individuals seated at the table.

Therefore, what is needed is a collapsible leg assembly that is very stable in its fully extended position, so that the possibility of tipping and swaying is minimized. Moreover, a collapsible leg assembly is needed that is faster and easier to set up and take down than the conventional folding support structures that are commercially available. In addition, a collapsible leg assembly is needed that has simple height adjustment mechanisms that can be quickly and easily actuated. Also, a collapsible leg assembly is needed that does not significantly interfere with user leg space when it is employed in a table assembly. Furthermore, a need exists for a collapsible leg assembly that folds substantially flat and occupies less space than conventional folding support structures so as to enable the easier transportation and storage thereof.

BRIEF SUMMARY OF THE INVENTION

Accordingly, the present invention is directed to a collapsible leg assembly that substantially obviates one or more problems resulting from the limitations and deficiencies of the related art.

A first object of one or more embodiments of the present invention is to provide a collapsible leg assembly that is extremely stable in its fully extended position, so that the possibility of tipping and swaying is minimized.

A second object of one or more embodiments of the present invention is to provide a collapsible leg assembly that can be set up and taken down in a quick and efficient manner.

A third object of one or more embodiments of the present invention is to provide a collapsible leg assembly with quick and efficient height adjustment capabilities.

A fourth object of one or more embodiments of the present invention is to provide a collapsible leg assembly that does not significantly interfere with user leg space when it is employed in a table assembly.

A fifth object of one or more embodiments of the present invention is to provide a collapsible leg assembly that folds substantially flat and occupies a minimal amount of overall space.

The aforedescribed objects are merely illustrative in nature. Additional objects and advantages of the present invention will be apparent from the following detailed description, the accompanying drawings, and the appended claims.

To achieve one or more of these objects and advantages, in accordance with a first aspect of the present invention, there is provided a collapsible leg assembly configured to elevate an object above a floor surface that includes: at least one pair of leg members, each of the leg members including an inner tubular member telescopically received within an outer tubular member; each of the inner tubular members having a first end that is pivotably coupled to the object and a second, opposed end that is slidably disposed within an interior portion of its respective outer tubular member, each of the outer tubular members having a first end that telescopically receives its respective inner tubular member and a second, opposed end that is configured to be disposed proximate to the floor surface when the collapsible leg assembly is in an operative extended position; an attachment member operatively connecting a first of the outer tubular members to a second of the outer tubular members, thereby establishing a pivotal axis about which the leg members are capable of rotating relative to one another, the attachment member and the pivotal axis defined thereby being disposed at a fixed location along the length of each of the outer tubular members between the first and second ends thereof; and at least one pair of latching devices, each of the latching devices being configured to selectively prevent the relative sliding movement of one of the inner tubular members relative to its respective outer tubular member.

In a preferred embodiment of this aspect of the present invention, the collapsible leg assembly further comprises a mounting frame that includes a first elongated bracket configured to be mounted to a bottom surface of the object, a second elongated bracket laterally spaced apart from the first elongated bracket and configured to be mounted to the bottom surface of the object, and a pair of elongated rods, each having opposed longitudinal ends, and each elongated rod being fixedly attached to the first end of a respective inner tubular member, a first of the elongated rods being disposed between the first elongated bracket and the second elongated bracket with a respective longitudinal end thereof being pivotably coupled to a respective elongated bracket near a first end thereof, and a second of the elongated rods being longitudinally spaced apart from the first of the elongated rods, the second of the elongated rods being disposed between the first elongated bracket and the second elongated bracket with a respective longitudinal end thereof being pivotably coupled to each of the elongated brackets near a second end thereof.

In another preferred embodiment, each of the first and second elongated brackets is in the form of an angle bracket and each of the opposed longitudinal ends of the elongated rods is pivotably coupled to each of the elongated angle brackets by means of a fastener attaching the longitudinal end of the elongated rod to a side of the elongated angle bracket.

In yet another preferred embodiment, each of the first and second elongated brackets is in the form of a channel bracket and each of the opposed longitudinal ends of the elongated rods is pivotably coupled to each of the elongated channel brackets by means of the opposed longitudinal ends of the elongated rods each being rotatably received within a respective aperture located in one side of each of the elongated channel brackets, the other, opposed side of each elongated channel bracket being imperforate so that each of the elongated rods is laterally restrained by the elongated channel brackets.

In still another preferred embodiment, each of the latching devices is disengaged when the leg assembly is in a collapsed position so that each of the leg members is capable of being extended without requiring any manipulation of the latching devices.

In yet another preferred embodiment, the leg assembly is capable of being extended without requiring any mechanism thereon to be released or manipulated.

In still another preferred embodiment, each of the latching devices comprises an elongated strip bent at an approximately 180 degree angle, thereby forming a first strip portion that includes a detent, a second, opposed strip portion spaced apart from, and disposed generally parallel to the first strip portion, and a third strip portion having a semi-circular shape and connecting an end of the first strip portion to an end of the second strip portion, wherein each of the latching devices is configured to be released by means of a user applying a force to an outer surface of each detent.

In yet another preferred embodiment, each of the latching devices is structurally configured to displace a detent inwardly so as to disengage it from an aperture in the outer tubular member in response to an axial tensile force being applied to an actuation cable or wire operatively coupled thereto.

In still another preferred embodiment, each of the latching devices comprises an elongated strip bent at an approximately 90 degree angle, the elongated strip comprising a first strip portion that includes a detent, a second strip portion disposed at an approximately 90 degree angle with respect to the first strip portion and having an aperture disposed therein, and a third filleted strip portion connecting the first strip portion to the second strip portion; a sleeve fixedly attached to the elongated strip adjacent to the third filleted strip portion; a first rod disposed through the sleeve, the opposed longitudinal ends of the first rod being received within a first set of apertures in opposed sides of the inner tubular member; a second rod spaced apart from the first rod, the opposed longitudinal ends of the second rod being received within a second set of apertures in opposed sides of the inner tubular member; a spring having a first end and a second end, the first end of the spring being attached to the second rod so as to substantially prevent the movement thereof relative to the inner tubular member, and the second end of the spring being attached to an end of an actuation cable or wire, the actuation cable or wire passing through the aperture in the second strip portion; and a cable stop disposed on the actuation cable or wire proximate to the location at which the actuation cable or wire is attached to the second end of the spring. In this preferred embodiment, when an axial force is applied to the actuation cable or wire, the spring is elastically deformed and the cable stop contacts the second strip portion, thereby rotating the bent elongated strip about the first rod and releasing the detent from an aperture in the outer tubular member so as to enable the relative sliding movement of the inner tubular member relative to its respective outer tubular member.

In yet another preferred embodiment, each of the latching devices comprises an insert having a flanged end and one or more internal cavities circumscribed by a plurality of walls, the insert being received within an interior of the inner tubular member; an elongated strip formed from a resilient material, the elongated strip including a detent and being affixed to an inner surface of one of the plurality of walls of the insert, the detent passing through a first aperture in said one of the plurality of walls of the insert, a second aperture in the inner tubular member, and when the latching device is in an engaged position, a third aperture in the outer tubular member; and an actuation cable or wire fixedly attached to the elongated strip at the detent, or proximate thereto, the actuation cable or wire being bent at an angle of between approximately 90 degrees and approximately 110 degrees within the insert and exiting the insert through a longitudinal end thereof. In this preferred embodiment, when an axial force is applied to the actuation cable or wire, the elongated strip is elastically deformed and displaced inwardly, thereby releasing the detent from the third aperture in the outer tubular member so as to enable the relative sliding movement of the inner tubular member relative to its respective outer tubular member.

In still another preferred embodiment, each of the outer tubular members comprises a plurality of apertures spaced apart along the length thereof, and each of the latching devices comprises a detent that is configured to individually engage with each of the plurality of apertures in the outer tubular member such that the leg assembly is capable of elevating the object at a plurality of predetermined heights above the floor.

In yet another preferred embodiment, the collapsible leg assembly further comprises a cable or wire actuation system operatively coupled to each of the latching devices, the cable or wire actuation system being configured to simultaneously disengage each of the latching devices so that each of the leg members collapses in substantially the same manner.

In still another preferred embodiment, the cable or wire actuation system comprises a first cable or wire operatively coupled to a first of the latching devices, a second cable or wire operatively coupled to a second of the latching devices, and a third cable or wire operatively coupled to both the first cable or wire and the second cable or wire, the third cable or wire being configured to simultaneously actuate each of the latching devices by means of the first and second cables or wires.

In yet another preferred embodiment, the at least one pair of leg members comprises two pairs of leg members laterally spaced apart from one another, the bottom ends of each set of the laterally spaced apart leg members both being connected to a base tubular member that is oriented substantially perpendicular to the extending directions thereof; and wherein at least one pair of latching devices comprises two pairs of latching devices, each of the latching devices being configured to selectively prevent the relative sliding movement between respective inner and outer tubular members of each leg member.

In still another preferred embodiment, the collapsible leg assembly further comprises a cable or wire actuation system operatively coupled to each of the latching devices, the cable or wire actuation system being configured to simultaneously disengage each of the latching devices so that each of the leg members collapses in substantially the same manner, the cable or wire actuation system including: a first cable or wire operatively coupled to a first of the latching devices; a second cable or wire operatively coupled to a second of the latching devices; a third cable or wire operatively coupled to a third of the latching devices; a fourth cable or wire operatively coupled to a fourth of the latching devices; and a fifth cable or wire operatively coupled to the first, second, third, and fourth cables or wires, the fifth cable or wire being configured to simultaneously actuate each of the latching devices by means of the first, second, third, and fourth cables or wires.

In yet another preferred embodiment, the collapsible leg assembly further comprises at least one pair of elongated rods, each of the elongated rods having a first end and a second end, the first end of each elongated rod being coupled to opposed walls of a respective inner tubular member, the second end of each elongated rod being formed in the shape of a hook, wherein each of the elongated rods is disposed inside a respective leg member and the hook of each elongated rod is configured to prevent the disengagement of the inner tubular member from its respective outer tubular member by grasping the attachment member when the second end of the inner tubular member is proximate to the first end of its respective outer tubular member.

In still another preferred embodiment, the object comprises one of the following: (i) a tabletop; (ii) a keyboard; or (iii) a housing for electronic equipment.

In accordance with a second aspect of the present invention, there is provided a collapsible leg assembly configured to elevate an object above a floor surface that includes: at least one pair of leg members, each of the leg members including an inner tubular member telescopically received within an outer tubular member; each of the inner tubular members having a first end that is pivotably coupled to the object and a second, opposed end that is slidably disposed within an interior portion of its respective outer tubular member, each of the outer tubular members having a first end that telescopically receives its respective inner tubular member and a second, opposed end that is configured to be disposed proximate to the floor surface when the collapsible leg assembly is in an operative extended position, wherein the second ends of the outer tubular members are not pivotally connected to a base frame; an attachment member operatively connecting a first of the outer tubular members to a second of the outer tubular members, thereby establishing a pivotal axis about which the leg members are capable of rotating relative to one another; and at least one pair of latching devices, each of the latching devices being configured to selectively prevent the relative sliding movement of one of the inner tubular members relative to its respective outer tubular member.

In a preferred embodiment of this aspect of the present invention, the second ends of the inner tubular members are only slidably displaced in portions of their respective outer tubular members between the attachment member and the first ends of their respective outer tubular members such that the second ends of the inner tubular members are not displaced across the pivotal axis.

In accordance with a third aspect of the present invention, there is provided a collapsible leg assembly configured to elevate an object above a floor surface that includes: at least one pair of leg members, each of the leg members including an inner tubular member telescopically received within an outer tubular member; each of the inner tubular members having a first end that is pivotably coupled to the object and a second, opposed end that is slidably disposed within an interior portion of its respective outer tubular member, each of the outer tubular members having a first end that telescopically receives its respective inner tubular member and a second, opposed end that is configured to be disposed proximate to the floor surface when the collapsible leg assembly is in an operative extended position; an attachment member operatively connecting a first of the outer tubular members to a second of the outer tubular members, thereby establishing a pivotal axis about which the leg members are capable of rotating relative to one another; and at least one pair of latching devices, each of the latching devices including a bent elongated strip, each of the latching devices being structurally configured to displace a detent inwardly so as to disengage it from an aperture in the outer tubular member in response to an axial force being applied to an actuation cable or wire operatively coupled thereto, and each of the latching devices being configured to selectively prevent the relative sliding movement of one of the inner tubular members relative to its respective outer tubular member.

It is to be understood that the foregoing objects and summary, and the following detailed description of the present invention, are merely exemplary and explanatory in nature. As such, the foregoing objects and summary, and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF THE PREFERRED EMBODIMENTS OF THE INVENTION

1. Terminology

As used herein, the term "tubular member" broadly refers to a hollow elongated body having a closed, or substantially closed, cross-section that is not limited to any specific cross-sectional shape. For example, the tubular member could have a generally square cross-section, a generally rectangular cross-section, a generally circular cross-section, a generally elliptical cross-section, a polygonal cross-section, or any combination of these cross-sectional shapes.

2. First Embodiment

Figure 1:
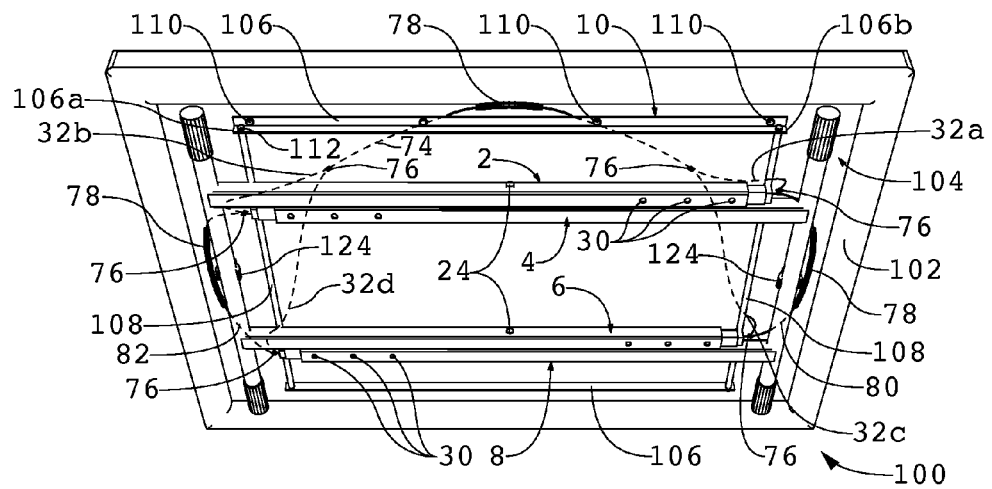
FIG. 1 is a perspective view of a collapsible leg assembly mounted to a tabletop, and being depicted in a collapsed position, according to a first embodiment of the invention.
Figure 2:
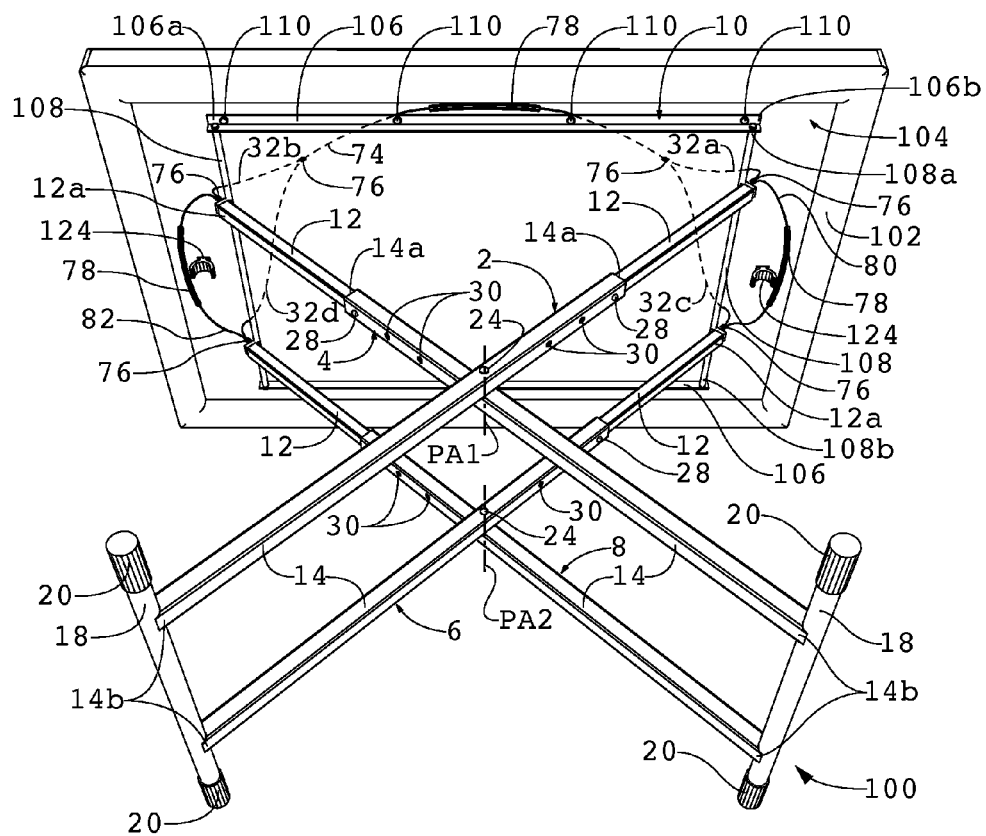
FIG. 2 is a perspective view of the collapsible leg assembly mounted to a tabletop, and being depicted in a fully extended position, according to the first embodiment of the invention.

A first embodiment of a collapsible leg assembly is seen generally at 100 in FIGS. 1 and 2. In the first exemplary embodiment of the invention, the collapsible leg assembly 100 is attached to the underside of a tabletop 102. The collapsible leg assembly 100 of the depicted embodiment principally comprises a first pair of telescoping leg members 2, 4 arranged in a scissors-like configuration; a second pair of telescoping leg members 6, 8 arranged in a scissors-like configuration and being laterally spaced apart from the first pair of telescoping leg members 2, 4; and a mounting frame 10 fixedly attached to a bottom surface 104 of the tabletop 102. The collapsed position of the collapsible leg assembly 100 is illustrated in FIG. 1, whereas the fully extended position of the collapsible leg assembly 100 is shown in FIG. 2.

As best shown in FIG. 2, each leg member 2, 4, 6, 8 includes an inner tubular member 12 that is telescopically received within an outer tubular member 14. Each inner tubular member 12 has a first end 12a (see FIGS. 2 and 5) that is pivotably coupled to the underside of the tabletop 102, and a second, opposed end 12b (see FIG. 4) that is slidably disposed within an interior portion 16 of its respective outer tubular member 14. Each outer tubular member 14 has a first end 14a that telescopically receives its respective inner tubular member 12 and a second, opposed end 14b that is configured to be disposed proximate to a floor surface when the collapsible leg assembly 100 is in an operative extended position. As illustrated in FIGS. 1 and 2, the second, lower ends 14b of laterally spaced apart outer tubular members 14 are both fixedly attached to a base tubular member 18 that is oriented substantially perpendicular to the extending directions thereof. It is readily apparent that the second, lower ends 14b of paired outer tubular members 14 (e.g., of leg members 2, 4) cannot be fixedly attached to one another. Otherwise, the collapsible leg assembly 10 would be unable to pivot about attachment members 24. Rather, it would be fixed in an unusable stationary position only. Preferably, the opposed longitudinal ends of each base tubular member 18 are provided with cap members 20 disposed thereon. When the collapsible leg assembly 100 is in its operative extended position, cap members 20 rest against the floor surface.

Figure 14:
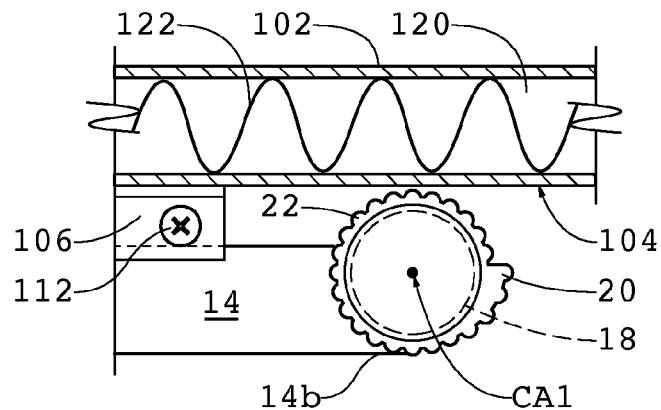
FIG. 14 is a side sectional view of a leg member and its associated base tubular member, being depicted in a collapsed position, according to the first embodiment of the invention.
Figure 15:
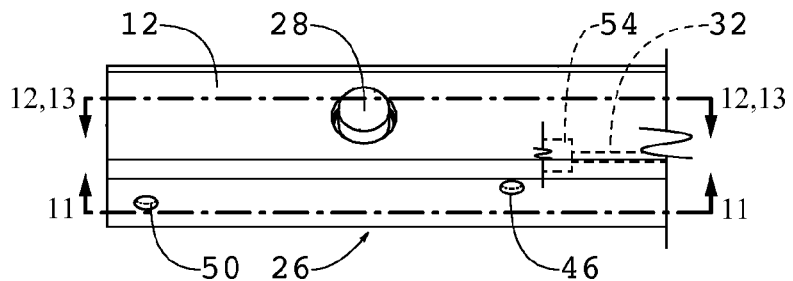
FIG. 15 is a perspective view of the second type of latching device used in the inventive collapsible leg assemblies.

In a preferred embodiment of the invention, each cap member 20 is preferably provided with a plurality of longitudinally-extending ribs 22 disposed about the circumference thereof (see FIG. 14). Also, each cap member 20 is preferably formed from a flexible polymeric material or rubber that is capable of being elastically deformed. Forming each cap member 20 from a flexible polymeric material or rubber offers numerous advantages. First, the use of rubber cap members 20 inhibits slippage of the collapsible leg assembly 100 along a floor surface, especially when the floor surface is relatively smooth and glossy (e.g., linoleum tile), Secondly, the use of rubber cap members 20 prevents the floor from being scratched by the base tubular member 18, which is typically formed from a rigid, metallic material. In addition, forming each cap member 20 from a flexible polymeric material or rubber enables the cap member 20 to be elastically deformed and fitted over a longitudinal end of base tubular member 18. The longitudinally-extending ribs 22 on each cap member 20 are also beneficial for inhibiting the slippage of the collapsible leg assembly 100 along a floor surface. This is particularly true when the collapsible leg assembly 100 is placed on a carpeted floor surface, and the ribs 22 engage with the carpet fibers. Also, referring to FIG. 14, it can be seen that the periphery of the cap member 20 has a generally spiral configuration. Advantageously, this spiral configuration enables the thickness of each cap member 20 to be selectively adjusted so as to account for uneven floor surfaces. The adjustability of the cap members 20 helps to prevent the collapsible leg assembly 100 from undesirably wobbling when it is used on an unlevel floor surface, thereby enhancing the overall stability of the collapsible leg assembly 100.

Referring again to FIG. 2, it can be seen that the two outer tubular members 14 of each pair of telescoping leg members are pivotally connected to one another by means of an attachment member 24. The attachment members 24 enable the paired leg members to move in a scissors-like manner with respect to one another, and they respectively establish a first pivotal axis PA1 about which the leg members 2, 4 are capable of rotating relative to one another and a second pivotal axis PA2 about which the leg members 6, 8 are capable of rotating relative to one another. The attachment members 24 and the pivotal axes PA1, PA2 defined thereby are disposed at fixed locations along the lengths of each outer tubular member 14. In particular, and referring to FIGS. 1 and 2, the attachment members 24 and the pivotal axes PA1, PA2 defined thereby are preferably located proximate to the middle of each outer tubular member 14.

In a preferred embodiment, each attachment member 24 comprises a nut and bolt combination. The bolt preferably passes through apertures on opposed sides of each outer tubular member 14 and is secured in place using an associated nut. Although, those of ordinary skill in the art will appreciate that the invention is not limited to this particular type of attachment means. Rather other suitable attachment members 24 may also be used to pivotally affix the paired outer tubular members 14 to one another including, but not limited to, other suitable fasteners, such as screws.

As explained above, each leg member 2, 4, 6, 8 includes an inner tubular member 12 that is slidably engaged with a respective outer tubular member 14 in a telescopic manner. Each pair of leg members 2, 4 and 6, 8 includes a pair of latching devices 26 (see e.g., FIG. 4). When engaged, each latching device 26 is disposed within an inner tubular member 12 and prevents the relative sliding movement of the inner tubular member 12 relative to its respective outer tubular member 14. In one preferred embodiment, such as that illustrated in FIG. 4, each latching device 26 is structurally configured to displace a detent 28 inwardly so as to disengage it from an aperture 30 in the outer tubular member 14 in response to an axial tensile force $F_{ax}$ being applied to an actuation cable 32 operatively coupled thereto. The different latching devices used in conjunction with the preferred embodiments of the invention will be described in more detail hereinafter.

Figure 3:
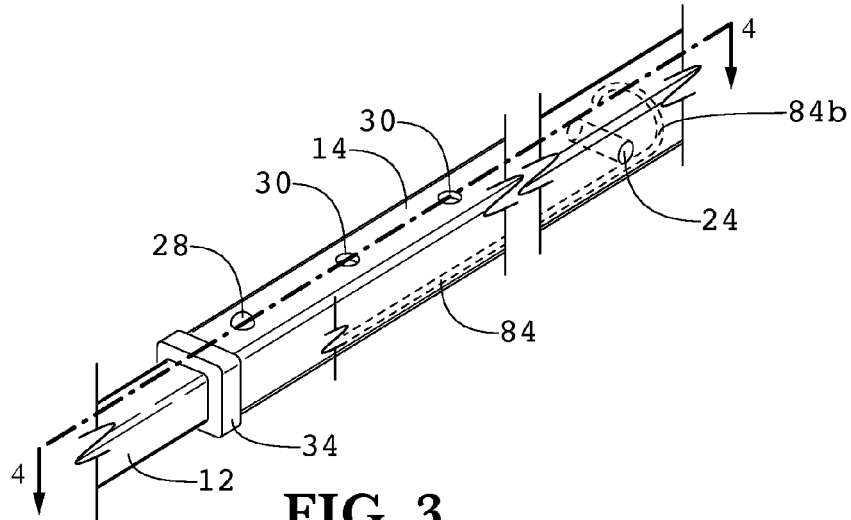
FIG. 3 is a partial perspective view of a leg member of the collapsible leg assembly according to the first embodiment of the invention.

As shown in FIGS. 1-3, each outer tubular member 14 preferably comprises a plurality of apertures 30 spaced apart at predetermined positions along the length thereof. The detent 28 of the latching device 26 disposed within the associated inner tubular member 12 is configured to individually engage with each of the plurality of apertures 30 in the outer tubular member 14 so that the leg assembly 100 is capable of elevating an object at a plurality of predetermined heights above a floor. In the first embodiment of the invention, each predetermined position corresponds to a particular height at which the tabletop 102 is capable of being elevated above a floor surface. For example, the tabletop 102 is preferably selectively adjustable to one of the following positions: (i) twenty-two (22) inches above the floor (e.g., to accommodate a child or act as a side table for adults), (ii) twenty-nine (29) inches above the floor (e.g., to serve as a table or desk for adults), or (iii) thirty-six (36) inches above the floor (e.g., when the standard countertop height is required). The first height of twenty-two (22) inches above the floor is achieved when the detent 28 is engaged with the aperture 30 in the outer tubular member 14 that is nearest to the attachment member 24. The second height of twenty-nine (29) inches above the floor is achieved when the detent 28 is engaged with the middle aperture 30 in the outer tubular member 14. The third height of thirty-six (36) inches above the floor is achieved when the detent 28 is engaged with the aperture 30 in the outer tubular member 14 that is nearest to its first end 14*a*.

While several exemplary height settings for the tabletop 102 have been described above, one of ordinary skill in the art will understand that the invention is not so limited. Rather, any suitable plurality of predetermined height settings is encompassed by the claimed invention. Other height settings may be determined and preset for specific uses, such as that which is required for supporting a particular power tool, etc.

Figure 4:
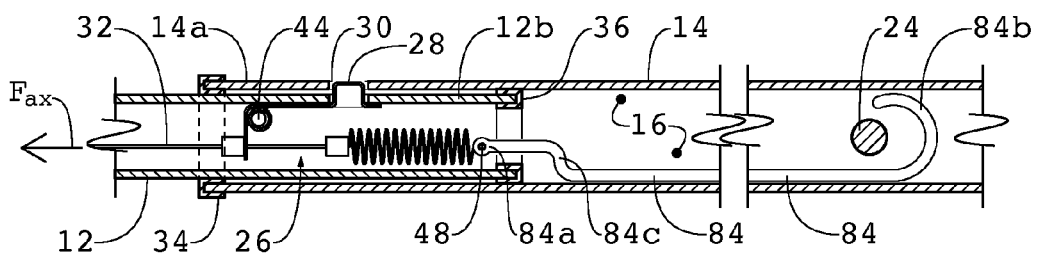
FIG. 4 is a partial longitudinal sectional view of a leg member of the collapsible leg assembly according to the first embodiment of the invention, which is cut along the cutting-plane line 4-4 in FIG. 3.
Figure 5:
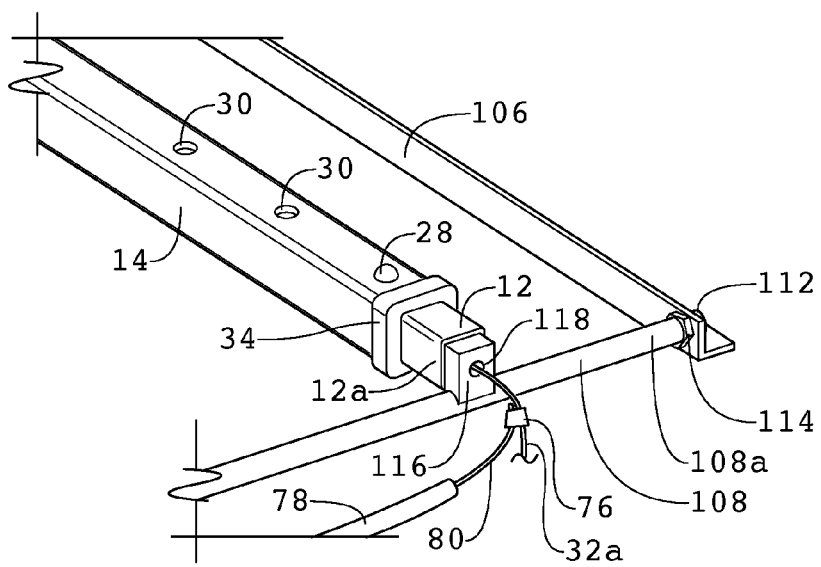
FIG. 5 is a partial perspective view of a leg member and mounting frame of the collapsible leg assembly according to the first embodiment of the invention.

Referring to FIGS. 3, 4, and 5, it can be seen that the first end 14*a* of each outer tubular member 14 is preferably provided with a peripheral cap member 34 to create a snugger fit between the sliding inner tubular member 12 and the outer tubular member 14 so that the inner tubular member 12 moves in a nearly linear manner as it is displaced without rattling. As best shown in FIG. 4, the cap member 34 is provided with a continuous slot in the rear thereof for engaging the first end 14*a* of the outer tubular member 14. In addition, as illustrated in FIGS. 3, 4, and 5, the cap member 34 is provided with a centrally disposed aperture therethrough for allowing the passage of the inner tubular member 12. The second end 12*b* of the inner tubular member 12 is also preferably provided with a peripheral cap member 36 to create a snugger fit between the sliding inner tubular member 12 and the interior surfaces of the outer tubular member 14 so as to enhance the engagement between the two components 12, 14. In a preferred embodiment of the invention, the cap members 34, 36 are both formed from a flexible polymeric material or rubber that is elastically deformable. Forming the cap members 34, 36 from a flexible polymeric material not only enables the cap members 34, 36 to dampen vibrations during the movement of the inner tubular members, but also enables the cap members 34, 36 to be elastically deformed and fitted over the ends 12*b*, 14*a* of the inner and outer tubular members 12, 14.

Next, the mounting frame 10 of the collapsible leg assembly 100 will be described in detail. In accordance with the first embodiment of the invention, and as shown in FIGS. 1 and 2, the mounting frame 10 generally comprises a pair of laterally spaced apart, elongated angle brackets 106 and a pair of longitudinally spaced apart, elongated rods 108. Each of the elongated angle brackets 106 is fixedly attached to the bottom surface 104 of the tabletop 102 by means of a plurality of fasteners 110 approximately equally spaced along the length thereof. In the illustrated embodiment, a total of four fasteners 110 are used to secure each of the elongated angle brackets. Also, in a preferred embodiment, the fasteners are in the form of screws. However, one of ordinary skill in the art will appreciate that other types and quantities of fasteners 110 may be used without departing from the spirit and scope of the claimed invention.

Each of the elongated angle brackets 106 has a first end 106*a* and a second end 106*b*. Each of the elongated rods 108 has opposed longitudinal ends 108*a*, 108*b*. As shown in FIGS. 1 and 2, a first of the elongated rods 108 is disposed between the laterally spaced, elongated angle brackets 106 with each of its longitudinal ends 108*a*, 108*b* being pivotably coupled to a respective elongated angle bracket 106 near a respective first end 106*a* thereof. Similarly, a second of the elongated rods 108 is also disposed between the laterally spaced, elongated angle brackets 106 with each of its longitudinal ends 108*a*, 108*b* being pivotably coupled to a respective elongated angle bracket 106 near a respective second end 106*b* thereof. As best illustrated in FIG. 5, the longitudinal ends 108*a*, 108*b* of the elongated rods 108 are preferably pivotally coupled to their respective elongated angle brackets 106 by means of a threaded fastener 112 (e.g., a screw or bolt) passing through an aperture in the upturned portion of elongated angle bracket 106 and mating with internal threads provided in the longitudinal end 108a, 108b of the elongated rods 108. Also, in a preferred embodiment of the invention, a nut 114 is provided between the longitudinal end 108a, 108b of each elongated rod 108 and the adjacent elongated angle bracket 106.

As shown in FIGS. 1 and 2, and more explicitly in the enlarged view of FIG. 5, each elongated rod 108 is fixedly attached to the first ends 12a of laterally spaced apart, inner tubular members 12 by means of end caps 116. Preferably, the ends caps 116 are affixed to the elongated rods 108 via welding and, in one embodiment of the invention, are fixedly attached to the first end 12a of their respective inner tubular members 12 by means of respective tubular portions that are attached to the inner surfaces of their inner tubular member 12. In this embodiment, the tubular portions of each end cap 116 are each received within the hollow cavity of a respective inner tubular member 12 and are affixed thereto by a plurality of laterally disposed rods. In another embodiment of the invention, the tubular portions are omitted from the end caps 116, and each end cap 116 is fixedly attached to the first end 12a of its respective inner tubular member 12 via welding. Referring again to FIG. 5, it can be seen that each end cap 116 is preferably provided with an aperture 118 disposed therethrough for allowing the passage of the actuation cable 32a. Preferably, the end caps 116 are fixedly attached to the elongated rods 108 via a protruding portion that is sized to accommodate the wall thickness of the inner tubular member 12 and the outer tubular member 14 so that the leg members 2, 4, 6, 8 lie substantially flat when the collapsible leg assembly 100 is in its collapsed position of FIG. 1.

Figure 11:
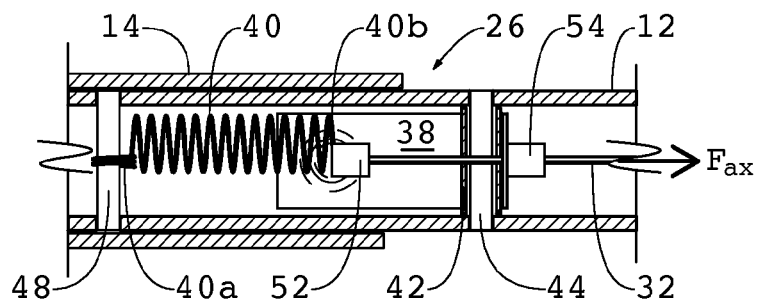
FIG. 11 is a bottom sectional view of a second type of latching device used in the inventive collapsible leg assemblies, which is cut along the cutting-plane line 11-11 in FIG. 15.
Figure 12:
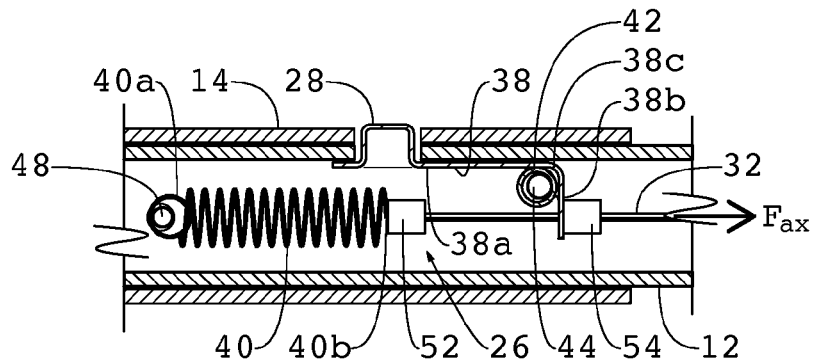
FIG. 12 is a side sectional view of the second type of latching device used in the inventive collapsible leg assemblies, wherein the latching device is illustrated in an engaged position and the section is cut along the cutting-plane line 12-12 in FIG. 15.
Figure 13:
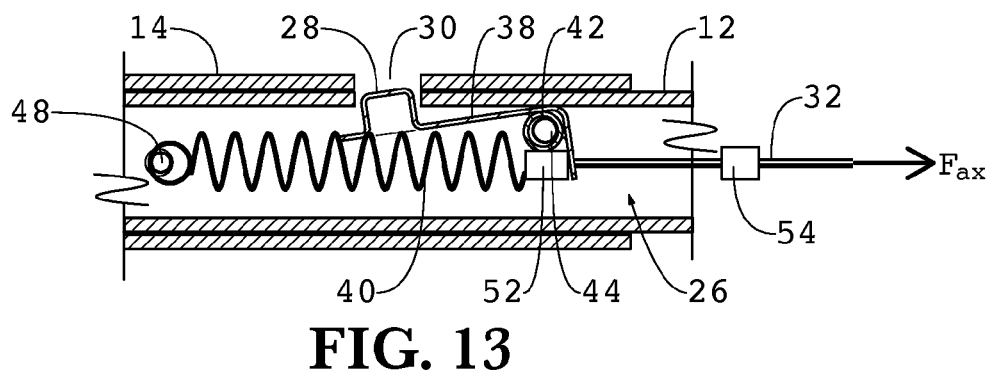
FIG. 13 is a side sectional view of the second type of latching device used in the inventive collapsible leg assemblies, wherein the latching device is illustrated in a disengaged position and the section is cut along the cutting-plane line 13-13 in FIG. 15.

One preferred type of latching device utilized in the collapsible leg assembly 100 is illustrated in FIGS. 11-13 and 15. Referring initially to the sectional view of FIG. 12, it can be seen that the latching device 26 generally comprises an elongated strip 38 bent at an approximately 90 degree angle and a tension spring 40. The elongated strip 38 includes a first strip portion 38a with the detent 28 formed therein, a second strip portion 38b disposed at an approximately 90 degree angle with respect to the first strip portion 38a and having an aperture disposed therein, and a third filleted strip portion 38c connecting the first strip portion 38a to the second strip portion 38b. A sleeve 42 is fixedly attached (e.g., by welding) to the elongated strip 38 adjacent to the third filleted strip portion 38c. A first rod 44 is disposed through the sleeve 42, with the opposed longitudinal ends of the first rod 44 being received within a first set of apertures 46 (see FIG. 15) in opposed sides of the inner tubular member 12. As illustrated in FIGS. 11-13, the tension spring 40 has a first end 40a and a second end 40b. A second rod 48 passes through an eyelet at the first end 40a of the tension spring 40. Because the opposed longitudinal ends of the second rod 48 are received within a second set of apertures 50 (see FIG. 15) in opposed sides of the inner tubular member 12, the movement of the first end 40a of the tension spring 40 is substantially prevented. The second end 40b of the tension spring 40 is attached to an end of the actuation cable 32. Referring to FIGS. 11-13, a first cable stop 52 is disposed near the connection of the actuation cable 32 to the second end 40b of the tension spring 40, while a second cable stop 54 is disposed on the opposite side of the second strip portion 38b near the aperture provided in the second strip portion 38b, through which the actuation cable 32 passes.

Now, referring to primarily to FIGS. 12 and 13, the operation of the first preferred type of latching device 26 will be described in detail. Initially, the manner in which the latching device 26 is disengaged (i.e., released) will be explained. First, when an axial force $F_{ax}$ is applied to the actuation cable 32, the cable stops 52, 54 are generally linearly displaced (i.e., to the right) and the tension spring 40 is elastically deformed to a stretched position similar to that shown in FIG. 13. As illustrated in this figure, the displacement of the cable stop 52 results in it contacting the inner surface of the second strip portion 38b, and consequently, rotating the elongated strip 38 in a counter-clockwise manner about the first rod 44. As the elongated strip 38 undergoes its counter-clockwise rotation, the detent 28 is gradually displaced inwardly until it is completely removed from the aperture 30 in the outer tubular member 14. Once the detent 28 has been removed from the aperture 30, the inner tubular member 12 is capable of being slidably displaced with respect to the outer tubular member 14.

When it is desired to lock the position of the inner tubular member 12 relative to the outer tubular member 14, the respective apertures in the inner and outer members 12, 14 are generally aligned with one another. Because the axial force $F_{ax}$ is not being applied to the actuation cable 32, the cable stops 52, 54 are generally linearly displaced (i.e., to the left) by the restoring spring force exerted by tension spring 40 until reaching the position depicted in FIG. 12. The displacement of the cable stop 54 results in it contacting the outer surface of the second strip portion 38b, and consequently, rotating the elongated strip 38 in a clockwise manner about the first rod 44. As the elongated strip 38 undergoes its clockwise rotation, the detent 28 is gradually displaced outwardly until it lies within the aperture 30 in the outer tubular member 14. Once the detent 28 is disposed within the aperture 30, the sliding movement of the inner tubular member 12 relative to the outer tubular member 14 is prevented.

Figure 16:
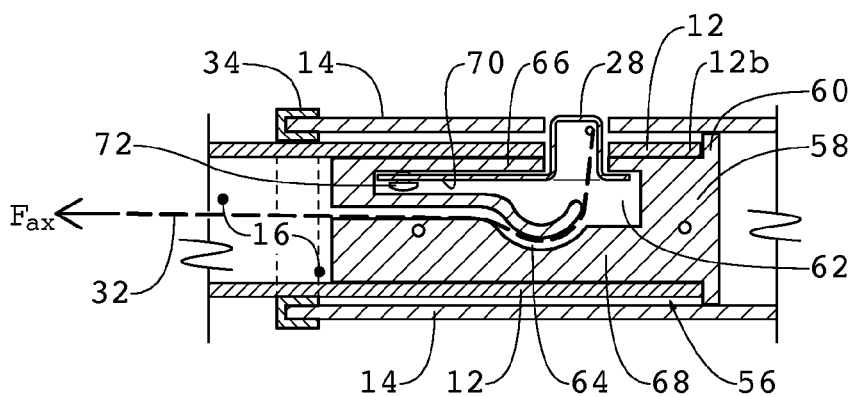
FIG. 16 is a side sectional view of a third type of latching device used in the inventive collapsible leg assemblies.

Another preferred type of latching device utilized in the collapsible leg assembly 100 is illustrated in the sectional view of FIG. 16. The latching device 56 generally comprises an insert body 58 received within an interior portion 16 of the inner tubular member 12 and a generally linear elongated strip 70 disposed within the insert body 58. As shown in this figure, the insert body 58 has a flanged end 60 and a plurality of cavities 62, 64 circumscribed by a plurality of walls 66, 68. The generally linear elongated strip 70 is formed from a resilient material and includes a detent 28 formed therein, similar to the first strip portion 38a of the elongated strip 38. Referring to FIG. 16, it can be seen that the elongated strip 70 is affixed to an inner surface of the wall 66 of the insert body 58 by means of a fastener 72, such as a screw or rivet. The detent 28 formed in the elongated strip 70 passes through a first aperture in the wall 66 of the insert body 58, a second aperture in the inner tubular member 12, and when the latching device 56 is in its engaged position (i.e., as shown in FIG. 16), a third aperture (aperture 30) in the outer tubular member 14. In the latching device 56, one end of the actuation cable 32 is preferably fixedly attached to the interior surface of the detent 28. As depicted in FIG. 16, the actuation cable 32 is bent at an overall angle of between approximately 90 degrees and approximately 110 degrees as it travels through the cavity 64 inside the insert body 58. After traveling through the curved cavity 64, the actuation cable exits the insert body 58 through its longitudinal end that is opposite to the flanged end 60. As illustrated in FIG. 16, the insert body 58 is inserted into the first end 12b of the inner tubular member 12 until the inner rim of its flanged end 60 abuts the peripheral edge of the inner tubular member 12. As described previously in conjunction with the latching device 26, the first end 14a of each outer tubular member 14 is preferably provided with a peripheral cap member 34 to create a snugger fit between the sliding inner tubular member 12 and the outer tubular member 14. However, the second end 12b of the inner tubular member 12 is not provided with the peripheral cap member 36 when the latching device 56 is utilized because the flanged end 60 of the insert body 58 performs the same function as that of the peripheral cap member 36.

Now, referring again to FIG. 16, the operation of the second preferred type of latching device 56 will be described in detail. Initially, the manner in which the latching device 56 is disengaged (i.e., released) will be explained. When an axial force $F_{ax}$ is applied to the actuation cable 32, the generally linear elongated strip 70 is elastically deformed and the detent 28 formed therein is displaced inwardly until it is completely removed from the aperture 30 in the outer tubular member 14. Once the detent 28 has been removed from the aperture 30, the inner tubular member 12 is capable of being slidably displaced with respect to the outer tubular member 14.

When it is desired to lock the position of the inner tubular member 12 relative to the outer tubular member 14, the respective apertures in the inner and outer members 12, 14 are generally aligned with one another. Because the axial force $F_{ax}$ is not being applied to the actuation cable 32, the detent 28 is gradually displaced outwardly by the restoring force of the elastically deformed elongated strip 70 until it again lies within the aperture 30 in the outer tubular member 14. Once the detent 28 is disposed within the aperture 30, the sliding movement of the inner tubular member 12 relative to the outer tubular member 14 is prevented.

In the preferred embodiment of the invention, the collapsible leg assembly 100 is provided with a cable actuation system operatively coupled to each of the latching devices 26, or to each of the latching devices 56. Advantageously, the cable actuation system is configured to simultaneously disengage each of the latching devices 26, or each of the latching devices 56, so that each of the leg members 2, 4, 6, 8 collapses in substantially the same manner and the extended length of each inner tubular member 12 remains generally consistent as the leg members 2, 4, 6, 8 are contracted. In other words, the cable actuation system is designed such that the leg members 2, 4, 6, 8 collapse in a coordinated manner and the tabletop 102 remains generally horizontal as it is lowered towards the floor surface.

One preferred cable actuation system utilized in the collapsible leg assembly 100 is depicted in FIGS. 1 and 2. For the sake of clarity and simplicity, the cable actuation system will be described in conjunction with the latching devices 26. However, one of ordinary skill in the art will readily appreciate that the cable actuation system can be used with other latching devices as well, such as latching devices 56 described hereinbefore. The cable actuation system of FIGS. 1 and 2 includes a first cable 32a operatively connected to a first of the latching devices 26, a second cable 32b operatively connected to a second of the latching devices 26, a third cable 32c operatively connected to a third of the latching devices 26, a fourth cable 32d operatively connected to a fourth of the latching devices 26, and a fifth cable 74 operative connected to the first, second, third and fourth cables 32a, 32b, 32c, 32d by means of cable ferrules or connectors 76 at the ends thereof. Preferably, a portion of the fifth cable 74 is provided with a sleeve 78 therearound, which serves as a handle that can be grasped by a user of the collapsible leg assembly 100 when he or she wants to extend its leg members 2, 4, 6, 8. The sleeve 78 is preferably formed from a flexible polymeric material that readily conforms to the curvature of the fifth cable 74 and protects a user's hand from the rough outer surface of fifth cable 74, which is preferably formed from a braided metallic material. As shown in FIGS. 1 and 2, the sleeve 78, which serves as an actuation handle for the collapsible leg assembly 100, is preferably located near the middle of the bottom surface 104 of the tabletop 102 so that a user can easily grasp the sleeve 78 (actuation handle) when the extension of the leg members 2, 4, 6, 8 is desired. The cables 32a-32d and 74 are shown as hidden lines in FIGS. 1 and 2 because they are preferably routed in the hollow cavity 120 of the tabletop 102 between reinforcing members 122 (see FIG. 14), and therefore, are concealed from view. The concealed routing of the cables 32a-32d and 74 not only enhances the aesthetic appearance of the collapsible leg assembly 100, but it also prevents the cables 32a-32d and 74 from catching on other objects when the assembly is transported from place to place.

Referring again to FIGS. 1 and 2, it can be seen that the cable actuation system of the collapsible leg assembly 100 is preferably provided with an alternative set of actuation handles as well. These actuation handles are also disposed underneath the tabletop 102, but near respective longitudinal ends thereof. The actuation handle on the right side of the tabletop 102 is formed by a sixth cable 80, which is operatively connected to the first cable 32a and the third cable 32c by respective cable ferrules or connectors 76. The actuation handle on the left side of the tabletop 102 is formed by a seventh cable 82, which is operatively connected to the second cable 32b and the fourth cable 32d by respective cable ferrules or connectors 76. Similar to the fifth cable 74 (center actuation cable) described in the preceding paragraph, both the sixth cable 80 and the seventh cable 82 are provided a sleeve 78 therearound, which serves as a handle that can be grasped by a user of the collapsible leg assembly 100 when he or she wants to extend its leg members 2, 4, 6, 8. However, if a user utilizes the side actuation handles rather than the center actuation handle to extend the leg members 2, 4, 6, 8, he or she will have to simultaneously pull on both the sleeves 78 of the sixth and seventh cables 80, 82 to deploy the leg members 2, 4, 6, 8 in a coordinated, symmetric manner.

In a preferred embodiment of the invention, in order to prevent each inner tubular member 12 from becoming disengaged from its respective outer tubular member 14, the second end 12b of each inner tubular member 12 is provided with a hooked rod assembly extending therefrom. In particular, referring to FIG. 4, the hooked rod assembly comprises an elongated rod 84 having a first end 84a and a second end 84b. The first end 84a of the elongated rod 84 is semi-flattened with an aperture disposed therethrough. The second rod 48 of the latching device 26 passes through the aperture in the flattened first end 84a of the elongated rod 84, thereby affixing it to the inner tubular member 12. As illustrated in FIG. 4, the second end 84b of the elongated rod 84 is formed in the shape of a hook. The elongated rod 84 is preferably provided with an offset 84c formed therein so that the elongated rod 84 can be diagonally oriented (see FIG. 3) within the interior of the outer tubular member 14 (e.g., the second end 84b of the elongated rod 84 is positioned at an approximately 45 degree angle with respect to the surface of the outer tubular member 14 having the apertures 30 disposed therethrough). The diagonal orientation of the second end 84b of the elongated rod 84 prevents the elongated rod 84 from inadvertently rotating within the interior of the outer tubular member 14. When each leg member 2, 4, 6, 8 reaches its fully extended position where the second end 12b of each inner tubular member 12 is proximate to the first end 14a of its respective outer tubular member 14, the hooked second end 84b of each elongated rod 84 prevents the disengagement of each inner tubular member 12 from its respective outer tubular member 14 by grasping the attachment member 24.

Advantageously, the collapsible leg assembly 100 is structurally configured such that its thickness is minimized when it is in the collapsed position, thereby making the collapsible leg assembly 100 less cumbersome to transport. Referring to FIG. 14, it can be seen that the base tubular member 18 is attached to the second end 14b of the outer tubular member in an offset manner so that the upper portion of the base tubular member 18 lies within the void space created by the height of the elongated angle bracket 106. As depicted in this figure, the lower surface of the outer tubular member 14 lies slightly below the lower circular surface of the base tubular member 18, while the upper surface of the outer tubular member 14 is joined to the base tubular member 18 at a location that is slightly above its central axis CA1. Also, as shown in FIG. 14, the upper surface of the outer tubular member 14 rests against the lower circular surface of the elongated rod 108 when the collapsible leg assembly 100 is in its collapsed position. As a result of such a structural configuration between the components 14, 18, 108, it is possible to minimize the collapsed thickness of the leg assembly 100 so that the amount of space occupied thereby is reduced.

In a preferred embodiment, the tabletop 102 is approximately twenty-two (22) inches by approximately forty-two (42) inches, and is formed from a molded polymeric material (i.e., a molded plastic top). In this preferred embodiment, leg members 2, 4, 6, 8 of the collapsible leg assembly 100 are formed from powder-coated steel tubing with the outer tubular members 14 having a cross-sectional width (or diameter if cylindrical members are used) of between approximately one (1) inch to approximately one and one-quarter (1¼) inches. Preferably, zinc-coated hardware is used with the powder-coated steel tubing. This preferred embodiment of the collapsible leg assembly 100 and the tabletop 102 would be suitable for general indoor, household use. Although, it is to be understood that the collapsible leg assembly 100 and the tabletop 102 are not limited to these exemplary dimensions and material selections. Rather, the invention can be practiced using other suitable dimensions without departing from the spirit and scope of the appended claims.

Now, the operation of the collapsible leg assembly 100 according to the first embodiment of the invention will be described in detail. Initially, the manner in which the collapsible leg assembly 100 is converted from its collapsed position illustrated in FIG. 1 to its fully extended position in FIG. 2 will be explained. One of the primary benefits of the inventive collapsible leg assembly 100 is the effortless manner in which the leg members 2, 4, 6, 8 can be extended. Advantageously, each of the latching devices 26 is disengaged when the collapsible leg assembly 100 is in the collapsed position of FIG. 1 so that each of the leg members 2, 4, 6, 8 is capable of being extended without requiring any manipulation of the latching devices 26. Rather, the only devices that are holding the leg members 2, 4, 6, 8 in place when they are in their collapsed position are semi-circular clip members 124 disposed on the bottom surface 104 of the tabletop 102. The semi-circular clip members 124 are sized to engage with respective base tubular members 18 as best shown in FIG. 1. Each of the semi-circular clip members 124 is preferably formed from an elastically deformable material, such as a resilient metallic material, that is capable of being removably attached to a respective base tubular member 18. When a user wants to extend the leg members 2, 4, 6, 8 of the collapsible leg assembly 100, he or she simply disengages each of the two base tubular members 18 from their respective clip members 124, and then, applies an abrupt, downward vertical force on the top of the tabletop 102. The combination of the downward vertical force applied by the user and the downward gravitation force results in the consequential extension of the leg members 2, 4, 6, 8. While the paired leg members 2, 4, and 6, 8 are rotating in a scissors-like manner about their respective attachment members 24, each inner tubular member 12 extends outward from the first end 14a of its respective outer tubular member 14 in a telescopic manner. Then, once each leg member 2, 4, 6, 8 reaches its fully extended position where the second end 12b of each inner tubular member 12 is proximate to the first end 14a of its respective outer tubular member 14, the hooked second end 84b of each elongated rod 84 prevents the disengagement of each inner tubular member 12 from its respective outer tubular member 14 by grasping the attachment member 24. After which, the detents 28 in each leg member 2, 4, 6, 8 will engage with the uppermost aperture 30 in each outer tubular member 14. As a result, the tabletop 102 will be arranged at its highest elevation above the floor when the collapsible leg assembly is first extended. Then, if it is desired to reduce the height of the tabletop 102 thereafter, the user must simply either pull on the center handle (sleeve 78 on fifth cable 74) or pull on the right and left handles simultaneously (sleeve 78 on sixth cable 80 and sleeve 78 on the seventh cable 82) to disengage the latching devices 26. Then, the detents 28 in each leg member 2, 4, 6, 8 can be repositioned in one of the two lower apertures 30 in each outer tubular member 14.

Next, the manner in which the collapsible leg assembly 100 is converted from its fully extended position in FIG. 2 to its collapsed position in FIG. 1 will be explained. Another one of primary benefits of the inventive collapsible leg assembly 100 is the simple manner in which the leg members 2, 4, 6, 8 can be collapsed. In order to simultaneously collapse the leg members 2, 4, 6, 8, a user must either pull on the center handle (sleeve 78 on fifth cable 74) or pull on the right and left handles simultaneously (sleeve 78 on sixth cable 80 and sleeve 78 on the seventh cable 82) and hold tension thereon until each detent 28 is positioned between the lowermost aperture 30 and the attachment member 24 in its respective outer tubular member 14. When the detent 28 reaches this region of its associated outer tubular member 14, it can no longer engage with any apertures 30, and thus, the leg assembly 100 can be easily moved to its fully collapsed position (i.e., as shown in FIG. 1) and the base tubular members 18 can be engaged with their respective semi-circular clip members 124. If the collapsible leg assembly 100 and the tabletop 102 are resting on their sides when the leg members 2, 4, 6, 8 are being collapsed, a user may also have to apply a slight compressive force directly on one of the leg members 2, 4, 6, 8, or on one of the base tubular members 18, to facilitate the contraction of the leg assembly 100. When the leg members 2, 4, 6, 8 are fully collapsed, the second end 12b of each inner tubular member 12 is disposed proximate to the attachment member 24 connecting its respective outer tubular member 14 to the other outer tubular member 14 in the pair. In the illustrated embodiment, the second ends 12b of the inner tubular members 12 are only slidably displaced in the portions of their respective outer tubular members 14 that lie between the attachment member 24 and the first ends 14a of their respective outer tubular members 14 (i.e., the second ends 12b of the inner tubular members 12 are not displaced across pivotal axes PA1, PA2). In some embodiments of the invention, the portion of the outer tubular member 14 in which its associated inner tubular member 12 is slidably displaced constitutes approximately one-half of the overall length of the outer tubular member 14, or less than one-half of the overall length of the outer tubular member 14.

3. Second Embodiment

Figure 6:
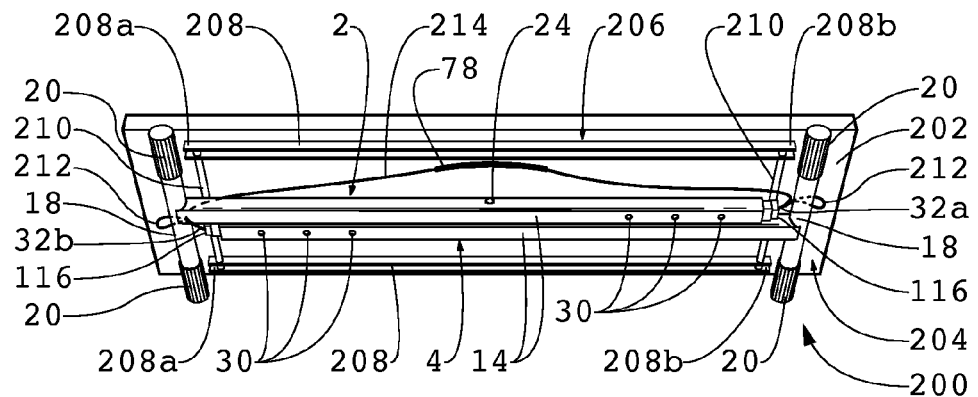
FIG. 6 is a perspective view of a collapsible leg assembly mounted to a keyboard support surface, and being depicted in a collapsed position, according to a second embodiment of the invention.
Figure 7:
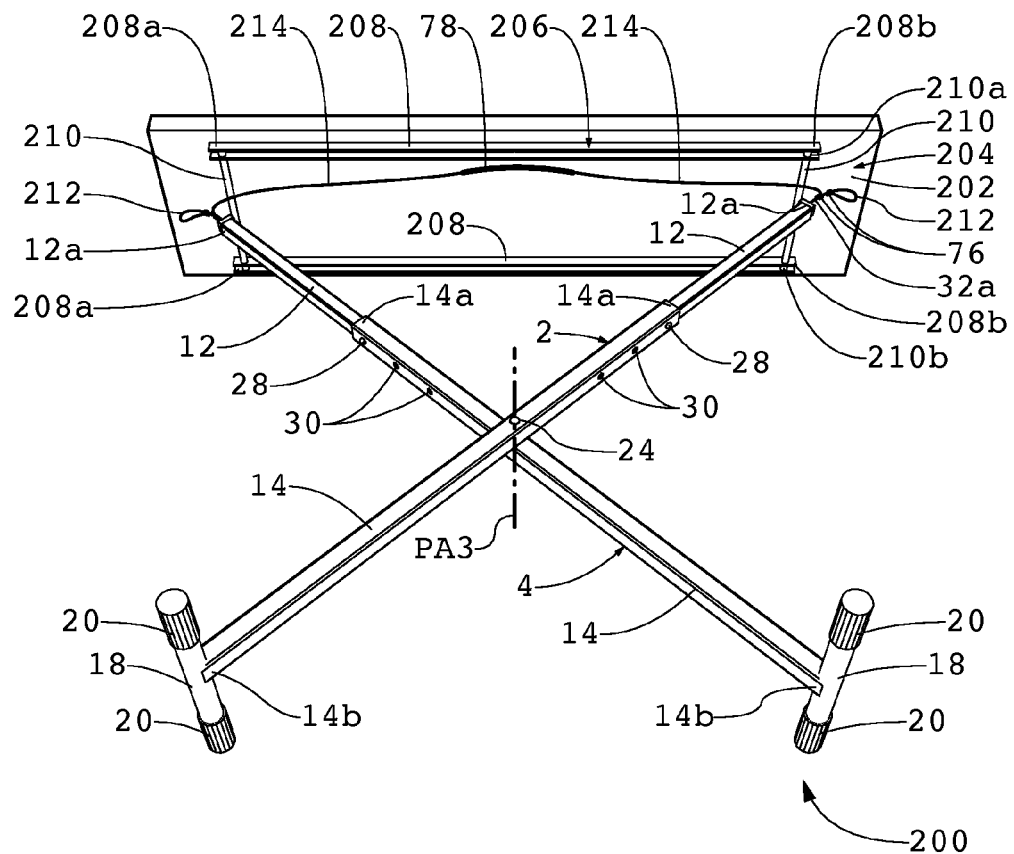
FIG. 7 is a perspective view of the collapsible leg assembly mounted to a keyboard support surface, and being depicted in a fully extended position, according to the second embodiment of the invention.

A second embodiment of a collapsible leg assembly is seen generally at 200 in FIGS. 6 and 7. In the second exemplary embodiment of the invention, the collapsible leg assembly 200 is attached to the underside of a substantially planar support surface 202, which could be used to support, among other things, a musical keyboard. Thus, in one exemplary embodiment, the collapsible leg assembly 200 is used as a musical keyboard stand. Unlike the first exemplary embodiment described hereinbefore, the collapsible leg assembly 200 depicted in FIGS. 6 and 7 comprises only one pair of telescoping leg members 2, 4 arranged in a scissors-like configuration. The collapsible leg assembly 200 also includes a mounting frame 206 that is fixedly attached to a bottom surface 204 of the substantially planar support surface 202. The collapsed position of the collapsible leg assembly 200 is illustrated in FIG. 6, whereas the fully extended position of the collapsible leg assembly 200 is shown in FIG. 7.

Referring to FIGS. 6 and 7, it can be seen that, in some respects, the second exemplary embodiment is similar to that of the first embodiment. Moreover, some parts are common to both such embodiments. For the sake of brevity, the parts that the second embodiment of the collapsible leg assembly has in common with the first embodiment will only be briefly mentioned, if at all, because these components have already been explained in detail above. Furthermore, in the interest of clarity, these components will be denoted using the same reference characters that were used in the first embodiment.

However, it is evident from FIGS. 6 and 7 that the second embodiment of the collapsible leg assembly also differs in several important respects from that of the first embodiment of FIGS. 1 and 2. The unique features of the second embodiment will be explained in detail below. One of ordinary skill in the art will appreciate that the constituent parts of the first and second embodiments may be readily combined with one another without departing from the spirit and scope of the invention.

First, turning to FIGS. 6 and 7, one can see that the structure of the mounting frame 206 of the collapsible leg assembly 200 differs in several respects from the mounting frame 10 of the first embodiment of FIGS. 1 and 2. The mounting frame 206 generally comprises a pair of laterally spaced apart, elongated channel brackets 208 and a pair of longitudinally spaced apart, elongated rods 210. Each of the elongated channel brackets 208 is fixedly attached to the bottom surface 204 of the substantially planar support surface 202 by means of a plurality of fasteners (not visible in FIGS. 6 and 7) passing through the base member of each elongated channel bracket 208. Preferably, each plurality of fasteners is approximately equally spaced along the length of the base member of each elongated channel bracket 208. As in the first embodiment of the invention, the fasteners preferably are in the form of screws. However, one of ordinary skill in the art will appreciate that other types of fasteners may be used without departing from the spirit and scope of the claimed invention.

Each of the elongated channel brackets 208 has a first end 208a and a second end 208b. Each of the elongated rods 210 has opposed longitudinal ends 210a, 210b. As shown in FIGS. 6 and 7, a first of the elongated rods 210 is disposed between the laterally spaced, elongated channel brackets 208 with each of its longitudinal ends 210a, 210b being pivotably coupled to a respective elongated channel bracket 208 near a respective first end 208a thereof. Similarly, a second of the elongated rods 210 is also disposed between the laterally spaced, elongated channel brackets 208 with each of its longitudinal ends 210a, 210b being pivotably coupled to a respective elongated channel bracket 208 near a respective second end 208b thereof. The longitudinal ends 210a, 210b of the elongated rods 210 are pivotally coupled to their respective elongated channel brackets 208 by means of each opposed longitudinal end 210a, 210b being rotatably received within a respective aperture located in the inner side of the elongated channel bracket 208. Referring to FIGS. 6 and 7, it can be seen that the other, opposed side of each elongated channel bracket 208 is imperforate so that each of the elongated rods 210 is laterally restrained by the elongated channel brackets 208.

As in the first embodiment of the invention, each elongated rod 210 is fixedly attached to the first end 12a of each inner tubular member 12 by means of end caps 116. Like the first embodiment, the ends caps 116 are affixed to each elongated rod 210 via welding and are fixedly attached to the first end 12a of their respective inner tubular members 12 by means of pinned tubular portions or welding. Also, as described with respect to the first embodiment each end cap 116 is preferably provided with an aperture 118 disposed therethrough for allowing the passage of the latching device actuation cable 32.

As illustrated in FIGS. 6 and 7, the second, lower end 14b of each outer tubular member 14 is fixedly attached to a base tubular member 18 that is oriented substantially perpendicular to the extending direction thereof. Preferably, the lower end 14b of each outer tubular member 14 is connected to a middle portion of each base tubular member 18. Also, as described above in conjunction the first embodiment, the opposed longitudinal ends of each base tubular member 18 are preferably provided with cap members 20 disposed thereon. When the collapsible leg assembly 200 is in its operative extended position, cap members 20 rest against the floor surface.

The overall structure of leg members 2, 4 and the latching devices used therewith are substantially the same as that described for the first embodiment of the invention. Like the collapsible leg assembly 100, the collapsible leg assembly 200 illustrated in FIGS. 6 and 7 can utilize either of the two types of latching devices 26, 56 interchangeably, or even combinations thereof. However, the cable actuation system used with collapsible leg assembly 200 differs in several important respects from cable actuation system used with the collapsible leg assembly 100, and thus, will be described hereinafter.

Like the collapsible leg assembly 100 described above, a preferred embodiment of the collapsible leg assembly 200 is provided with a cable actuation system operatively coupled to each of the latching devices 26, or to each of the latching devices 56. Advantageously, the cable actuation system is configured to simultaneously disengage each of the latching devices 26, or each of the latching devices 56, so that each of the leg members 2, 4 collapses in substantially the same manner and the extended length of each inner tubular member 12 remains generally consistent as the leg members 2, 4 are contracted. In other words, the cable actuation system is designed such that the leg members 2, 4 collapse in a coordinated manner and the substantially planar support surface 202 remains generally horizontal as it is lowered towards the floor surface.

One preferred cable actuation system utilized in the collapsible leg assembly 200 is depicted in FIGS. 6 and 7. For the sake of clarity and simplicity, the cable actuation system will be described in conjunction with the latching devices 26.

However, one of ordinary skill in the art will readily appreciate that the cable actuation system can be used with other latching devices as well, such as latching devices 56. The cable actuation system of FIGS. 6 and 7 includes a first cable 32a operatively connected to a first of the latching devices 26 and a second cable 32b operatively connected to a second of the latching devices 26. Preferably, both the first cable 32a and the second cable 32b are provided with a looped portion 212 that is formed by bending the end portion of each cable 32a, 32b into the shape of a loop, and then, attaching the outer end of each cable 32a, 32b to another portion of the same cable 32a, 32b by means of a cable ferrule or connector 76. As shown in FIGS. 6 and 7, each of the looped portions 212 serve as a grasping mechanism for the collapsible leg assembly 200 so that a user can easily grasp the looped portions 212 with his or her fingers when the extension of the leg members 2, 4 is desired. In order to deploy the leg members 2, 4 in a coordinated, symmetric manner, a user needs to simultaneously pull on both of the looped portions 212 at the opposed ends of the substantially planar support surface 202.

Referring again to FIGS. 6 and 7, it can be seen that the cable actuation system of the collapsible leg assembly 200 is preferably provided with a centrally positioned actuation handle as well. As shown in these figures, a third cable 214 is operative connected to the first and second cables 32a, 32b by means of cable ferrules or connectors 76 at the ends thereof. Preferably, a portion of the third cable 214 is provided with a sleeve 78 therearound, which serves as a handle that can be grasped by a user of the collapsible leg assembly 200 when he or she wants to extend its leg members 2, 4. The material construction of the sleeve 78 is the same as that described for the first embodiment of the invention, and thus, no further discussion of its construction is necessary with regard to the second embodiment. As shown in FIGS. 6 and 7, the sleeve 78, which serves as an actuation handle for the collapsible leg assembly 200, is preferably located near the middle of the bottom surface 204 of the substantially planar support surface 202 so that a user can easily grasp the sleeve 78 (actuation handle) when the extension of the leg members 2, 4 is desired. If a user utilizes the centrally positioned actuation handle rather than the looped portions 212 to extend the leg members 2, 4, he or she only needs to pull on the sleeve 78 of the third cable 214 to deploy the leg members 2, 4 in a coordinated, symmetric manner. The inventor has additionally included the centrally positioned actuation handle on the collapsible leg assembly 200 so that users with a shorter arm span, for whom it may be difficult to reach the widely spaced apart looped portions 212, can still easily deploy the leg members 2, 4 of the collapsible leg assembly 200.

In a preferred embodiment, leg members 2, 4 of the collapsible leg assembly 200 are formed from aluminum tubing with the outer tubular members 14 having a cross-sectional width (or diameter if cylindrical members are used) of between approximately one (1) inch to approximately one and one-half (1½) inches and a tube wall thickness of approximately one-eighth (⅛) of an inch (i.e., heavy gauge tubing). This preferred embodiment of the collapsible leg assembly 200 would be suitable for specific applications that involve relatively heavy loads (e.g., a musical keyboard stand or a power tool stand). Although, it is to be understood that the collapsible leg assembly 200 is not limited to these exemplary dimensions and material selections. Rather, the invention can be practiced using other suitable dimensions and materials without departing from the spirit and scope of the appended claims.

Now, the operation of the collapsible leg assembly 200 according to the second embodiment of the invention will be explained in detail. Initially, the manner in which the collapsible leg assembly 200 is converted from its collapsed position illustrated in FIG. 6 to its fully extended position in FIG. 7 will be explained. Like the collapsible leg assembly 100, one of the primary benefits of the inventive collapsible leg assembly 200 is the effortless manner in which the leg members 2, 4 can be extended. Advantageously, each of the latching devices 26 (or latching devices 56) is disengaged when the collapsible leg assembly 200 is in the collapsed position of FIG. 6 so that each of the leg members 2, 4 is capable of being extended without requiring any manipulation of the latching devices 26. Also, in the second embodiment of the invention, because the leg members 2, 4 are not clipped or otherwise attached to the bottom surface 204 of the substantially planar support surface 202, the collapsible leg assembly 200 is capable of being extended without requiring any mechanism thereon to be released or manipulated. Thus, when a user wants to extend the leg members 2, 4 of the collapsible leg assembly 200, he or she simply applies an abrupt, downward vertical force on the top of the substantially planar support surface 202. The combination of the downward vertical force applied by the user and the downward gravitation force results in the consequential extension of the leg members 2, 4. While the leg members 2, 4 are rotating in a scissors-like manner about their attachment member 24, each inner tubular member 12 extends outward from the first end 14a of its respective outer tubular member 14 in a telescopic manner. Then, once each leg member 2, 4 reaches its fully extended position where the second end 12b of each inner tubular member 12 is proximate to the first end 14a of its respective outer tubular member 14, the hooked second end 84b of each elongated rod 84 prevents the disengagement of each inner tubular member 12 from its respective outer tubular member 14 by grasping the attachment member 24 (the second embodiment also includes the hooked rod assemblies described in conjunction with the first embodiment). After which, the detents 28 in each leg member 2, 4 will engage with the uppermost aperture 30 in each outer tubular member 14. As a result, the substantially planar support surface 202 will be arranged at its highest elevation above the floor when the collapsible leg assembly 200 is first extended. Then, if it is desired to reduce the height of the substantially planar support surface 202 thereafter, the user must simply either pull on the center handle (sleeve 78 on third cable 214) or pull on the right and left looped portions 212 simultaneously (of first and second cables 32a, 32b) to disengage the latching devices 26. Then, the detents 28 in each leg member 2, 4 can be repositioned in one of the two lower apertures 30 in each outer tubular member 14.

Next, the manner in which the collapsible leg assembly 200 is converted from its fully extended position in FIG. 7 to its collapsed position in FIG. 6 will be explained. Like the collapsible leg assembly 100, another one of primary benefits of the inventive collapsible leg assembly 200 is the simple manner in which the leg members 2, 4 can be collapsed. In order to simultaneously collapse the leg members 2, 4, a user must either pull on the center handle (sleeve 78 on third cable 214) or pull on the right and left looped portions 212 simultaneously (of first and second cables 32a, 32b) and hold tension thereon until each detent 28 is positioned between the lowermost aperture 30 and the attachment member 24. When the detent 28 reaches this region of its associated outer tubular member 14, it can no longer engage with any apertures 30, and thus, the leg assembly 200 can be easily moved to its fully collapsed position (i.e., as shown in FIG. 6). If the collapsible leg assembly 200 and the substantially planar support surface 202 are resting on their sides when the leg members 2, 4 are being collapsed, a user may also have to apply a slight compressive force directly on one of the leg members 2, 4, or on one of the base tubular members 18, to facilitate the contraction of the leg assembly 200. When the leg members 2, 4 are fully collapsed, the second end 12b of each inner tubular member 12 is disposed proximate to the attachment member 24 connecting its respective outer tubular member 14 to the other outer tubular member 14. The second ends 12b of the inner tubular members 12 are only slidably displaced in the portions of their respective outer tubular members 14 that lie between the attachment member 24 and the first ends 14a of their respective outer tubular members 14 (i.e., the second ends 12b of the inner tubular members 12 are not displaced across pivotal axis PA3). In some embodiments of the invention, the portion of the outer tubular member 14 in which its associated inner tubular member 12 is slidably displaced constitutes approximately one-half of the overall length of the outer tubular member 14, or less than one-half of the overall length of the outer tubular member 14.

4. Third Embodiment

Figure 8:
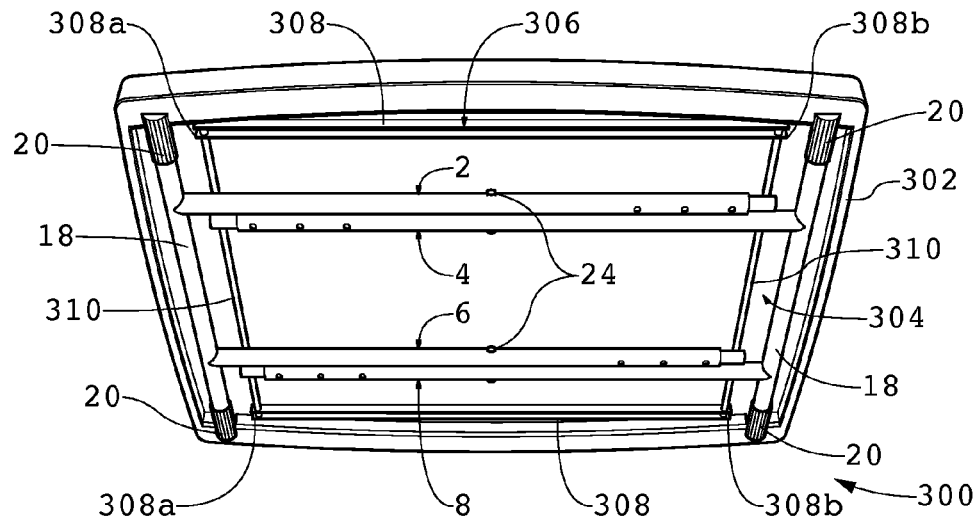
FIG. 8 is a perspective view of a collapsible leg assembly mounted to a tabletop, and being depicted in a collapsed position, according to a third embodiment of the invention.
Figure 9:
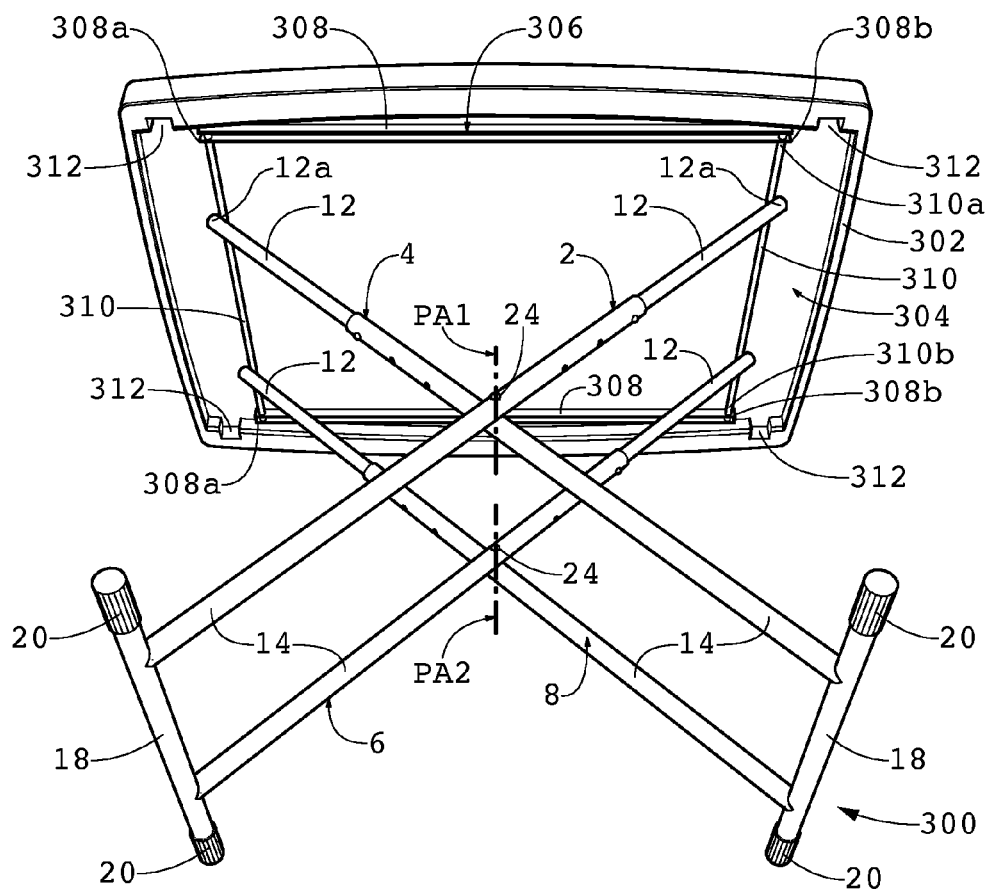
FIG. 9 is a perspective view of the collapsible leg assembly mounted to a tabletop, and being depicted in a fully extended position, according to the third embodiment of the invention.

A third embodiment of a collapsible leg assembly is seen generally at 300 in FIGS. 8 and 9. In the third exemplary embodiment of the invention, like the first embodiment, the collapsible leg assembly 300 is attached to the underside of a tabletop 302. Also, similar to the first embodiment, the collapsible leg assembly 300 comprises a first pair of telescoping leg members 2, 4 arranged in a scissors-like configuration and a second pair of telescoping leg members 6, 8 arranged in a scissors-like configuration, the second pair of telescoping leg members 6, 8 being laterally spaced apart from the first pair of telescoping leg members 2, 4. The collapsible leg assembly 300 also includes a mounting frame 306 that is fixedly attached to a bottom surface 304 of the tabletop 302. The mounting frame 306 has a structure that is substantially same as that of the second embodiment, with exception of the manner in which the outer tubular members 12 are connected to the elongated rods. The collapsed position of the collapsible leg assembly 300 is illustrated in FIG. 8, whereas the fully extended position of the collapsible leg assembly 300 is shown in FIG. 9.

Referring to FIGS. 8 and 9, it can be seen that, in some respects, the third exemplary embodiment is similar to that of the first and second embodiments. Moreover, some parts are common to all such embodiments. For the sake of brevity, the parts that the third embodiment of the collapsible leg assembly has in common with the first and second embodiments will only be briefly mentioned, if at all, because these components have already been explained in detail above. Furthermore, in the interest of clarity, these components will be denoted using the same reference characters that were used in the first and second embodiments.

However, it is evident from FIGS. 8 and 9 that the third embodiment of the collapsible leg assembly also differs in several important respects from that of the first and second embodiment of the invention. The unique features of the third embodiment will be explained in detail below. One of ordinary skill in the art will appreciate that the constituent parts of the first, second, and third embodiments may be readily combined with one another without departing from the spirit and scope of the invention.

First, turning to FIGS. 8 and 9, one can see that the paired leg members 2, 4, and 6, 8 have a substantially circular cross-section, rather than a substantially square cross-section like the paired leg members 2, 4, and 6, 8 in the first embodiment and leg members 2, 4 in the second embodiment. However, the overall structure of the paired leg members 2, 4, and 6, 8 in the third embodiment is otherwise generally similar to that of the leg members in the preceding two embodiments.

The mounting frame 306 of the collapsible leg assembly 300 is generally the same as the mounting frame 206 described above for the second embodiment. The pair of laterally spaced apart, elongated channel brackets 308 is generally equivalent to the pair of elongated channel brackets 208 of the collapsible leg assembly 200. Similarly, the pair of longitudinally spaced apart, elongated rods 310 is generally equivalent to the pair of pair of longitudinally spaced apart, elongated rods 210 in the second embodiment. Also, similar to the second embodiment, the longitudinal ends 310a, 310b of the first elongated rod 310 are pivotably coupled to a respective elongated channel bracket 308 near a respective first end 308a thereof, whereas longitudinal ends 310a, 310b of the second elongated rod 310 are pivotably coupled to a respective elongated channel bracket 308 near a respective second end 308b thereof. However, the manner in which the first ends 12a of the inner tubular members 12 are connected to the elongated rods 310 differs from that of the second embodiment. In particular, as shown in FIGS. 8 and 9, the first ends 12a of the inner tubular members 12 are tangentially connected to the curved surface of the elongated rods 310, preferably, by a welded connection or other suitable attachment means. Advantageously, the tangential connection between the inner tubular members 12 and the elongated rods 310 allows the leg members 2, 4, 6, 8 to lay substantially flat when the collapsible leg assembly 300 is in the collapsed position of FIG. 8.

Figure 10:
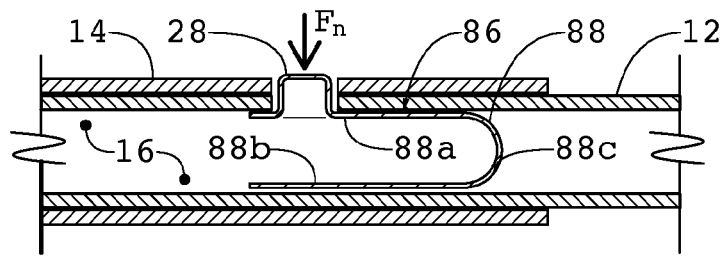
FIG. 10 is a side sectional view of a first type of latching device used in the inventive collapsible leg assemblies.

One preferred type of latching device utilized in the collapsible leg assembly 300 is illustrated in FIG. 10. Unlike the latching devices 26, 56 explained hereinbefore, the latching device 86 is a manual-type latching device that is designed to be actuated without the use of a cable actuation system. As shown in FIG. 10, the latching device 86 generally comprises an elongated strip 88 bent at an approximately 180 degree angle such it has a generally U-shaped geometry. The elongated strip 88 includes a first strip portion 88a with the detent 28 formed therein, a second, opposed strip portion 88b spaced apart from, and disposed generally parallel to the first strip portion 88a, and a third strip portion 88c having a semi-circular shape and connecting an end of the first strip portion 88a to an end of the second strip portion 88b. The elongated strip 88 is formed from a resilient material, and thus, acts as a spring member when a force is applied to the detent 28 of the first strip portion 88a.

Now, referring to FIG. 10, the operation of the latching device 86 will be explained. Initially, the manner in which the latching device 86 is disengaged (i.e., released) will be described. First, when a generally normal force $F_N$ is applied to the top outer surface of the detent 28, the first strip portion 88a is displaced radially inward towards the second, opposed strip portion 88b and the elongated strip 88 is elastically deformed in a spring-like manner. As the elongated strip 88 undergoes its deformation, the detent 28 is displaced inwardly until it is completely removed from the aperture 30 in the outer tubular member 14. Once the detent 28 has been removed from the aperture 30, the inner tubular member 12 is capable of being slidably displaced with respect to the outer tubular member 14. As the inner tubular member 12 is slidably adjusted relative to its outer tubular member 14, the top of the detent 28 slides along the inner curved surface of the tubular member 14, and remains in a disengaged position until reaching one of the apertures 30 in the outer tubular member 14.

When it is desired to lock the position of the inner tubular member 12 relative to the outer tubular member 14, the respective apertures in the inner and outer members 12, 14 are generally aligned with one another. Because the external normal force $F_N$ is not being applied to the detent 28, the first strip portion 88a is displaced radially outward by the restoring spring force of the resilient elongated strip 88. As the first strip portion 88a undergoes its outward displacement, the detent 28 is displaced outwardly in a similar fashion until it lies within the aperture 30 in the outer tubular member 14, provided that the apertures in the inner and outer tubular members 12, 14 are generally aligned with one another. Once the detent 28 is disposed within the aperture 30, the sliding movement of the inner tubular member 12 relative to the outer tubular member 14 is prevented.

In one preferred embodiment, the tabletop 302 is approximately eighteen (18) inches by approximately thirty (30) inches, and is formed from a molded polymeric material (i.e., a molded plastic top). In this preferred embodiment, leg members 2, 4, 6, 8 of the collapsible leg assembly 300 are formed from powder-coated steel tubing with the outer tubular members 14 having a cross-sectional width (or diameter if cylindrical members are used) of approximately three-quarters (¾) of an inch. Preferably, zinc-coated hardware is used with the powder-coated steel tubing. This preferred embodiment of the collapsible leg assembly 300 and the tabletop 302 would be suitable for general indoor use (e.g., as a portable dinner table or desk). Although, it is to be understood that the collapsible leg assembly 300 and the tabletop 302 are not limited to these exemplary dimensions and material selections. Rather, the invention can be practiced using other suitable dimensions and materials without departing from the spirit and scope of the appended claims.

In another preferred embodiment, the leg members 2, 4, 6, 8 of the collapsible leg assembly 300 are formed from stainless steel tubing, rather than powder-coated steel tubing. This preferred embodiment of the collapsible leg assembly 300 would be suitable for outdoor and marine use (i.e., where corrosion is a concern). However, it is to be understood that the collapsible leg assembly 300 is not limited these exemplary material selections. Rather, the invention can be practiced using other suitable materials without departing from the spirit and scope of the appended claims.

Now, the operation of the collapsible leg assembly 300 according to the third embodiment of the invention will be described in detail. Initially, the manner in which the collapsible leg assembly 300 is converted from its collapsed position illustrated in FIG. 8 to its fully extended position in FIG. 9 will be explained. One of the primary benefits of the inventive collapsible leg assembly 300 is the simple manner in which the leg members 2, 4, 6, 8 can be extended. Advantageously, each of the latching devices 86 is disengaged when the collapsible leg assembly 300 is in the collapsed position of FIG. 1 so that each of the leg members 2, 4, 6, 8 is capable of being extended without requiring any manipulation of the latching devices 86. Also, in the third embodiment of the invention, because the leg members 2, 4, 6, 8 are not clipped or otherwise attached to the bottom surface 304 of the tabletop 302, the collapsible leg assembly 300 is capable of being extended without requiring any mechanism thereon to be released or manipulated. Rather, when they are in their collapsed position, the leg members 2, 4, 6, 8 are only held in place by virtue of the frictional engagement between each cap member 20 and their respective recesses 312 in the underside of tabletop 302. Each resilient cap member 20 is designed to have an outermost diameter (e.g., as measured at the outer surface of longitudinally-extending ribs 22) that is slightly larger than the width of each recess 312 so as create a friction fit between each resilient cap member 20 and its respective recess 312. When a user wants to extend the leg members 2, 4, 6, 8 of the collapsible leg assembly 300, he or she simply pulls outwardly on the base tubular members 18, each of which is connected to two leg members 2, 6 and 4, 8, so as to overcome the frictional engagement between the resilient cap members 20 and their respective recesses 312. As the user pulls outwardly on the base tubular members 18, the paired leg members 2, 4, and 6, 8 are rotate in a scissors-like manner about their respective attachment members 24. While the paired leg members 2, 4, and 6, 8 are rotating, each inner tubular member 12 extends outwardly from the first end 14a of its respective outer tubular member 14 in a telescopic manner. Initially, the detents 28 in each leg member 2, 4, 6, 8 will engage with the lowermost aperture 30 in each outer tubular member 14. As a result, the tabletop 302 will be arranged at its lowest elevation above the floor when the collapsible leg assembly 300 is first extended. Then, if it is desired to increase the height of the tabletop 302 thereafter, the user must simply press the detents 28 radially inward to disengage the latching devices 86. Then, the detents 28 in each leg member 2, 4, 6, 8 can be repositioned in one of the two higher apertures 30 in each outer tubular member 14.

Next, the manner in which the collapsible leg assembly 300 is converted from its fully extended position in FIG. 9 to its collapsed position in FIG. 8 will be explained. Another one of primary benefits of the inventive collapsible leg assembly 300 is the simple manner in which the leg members 2, 4, 6, 8 can be collapsed. In order to collapse the leg members 2, 4, 6, 8, a user must simply press the detents 28 radially inward to disengage the latching devices 86, and then, slide the outer tubular members 14 with respect to the inner tubular members 12. Once each detent 28 is positioned between the lowermost aperture 30 and the attachment member 24 in its respective outer tubular member 14, it can no longer engage with any apertures 30, and thus, the leg assembly 300 can be easily moved to its fully collapsed position (i.e., as shown in FIG. 8) and the resilient cap members 20 can be engaged with their respective recesses 312. When the leg members 2, 4, 6, 8 are fully collapsed, the second end 12b of each inner tubular member 12 is disposed proximate to the attachment member 24 connecting its respective outer tubular member 14 to the other outer tubular member 14 in the pair. As in the first two embodiments of the invention, the second ends 12b of the inner tubular members 12 are only slidably displaced in the portions of their respective outer tubular members 14 that lie between the attachment member 24 and the first ends 14a of their respective outer tubular members 14 (i.e., the second ends 12b of the inner tubular members 12 are not displaced across pivotal axes PA1, PA2). In some embodiments of the invention, the portion of the outer tubular member 14 in which its associated inner tubular member 12 is slidably displaced constitutes approximately one-half of the overall length of the outer tubular member 14, or less than one-half of the overall length of the outer tubular member 14.

Although the invention has been shown and described with respect to a certain embodiment or embodiments, it is apparent that this invention can be embodied in many different forms and that many other modifications and variations are possible without departing from the spirit and scope of this invention.

For example, while either one or two pairs of leg members were utilized in the illustrated embodiments of the invention, one of ordinary skill in the art will appreciate that the invention is not so limited. Rather, any number of pairs of leg members can be used in the collapsible leg assembly without departing from the spirit and scope of the claimed invention. For example, when additional strength is required to support a heavy load, three or more pairs of leg members could be used in the collapsible leg assembly.

Moreover, as another example, while actuation cables were described in conjunction with the illustrated embodiments of the invention, one of ordinary skill in the art will appreciate that wires may be used in lieu of cables to actuate the latching devices in the collapsible leg assembly.

In addition, the inventor has contemplated that a myriad of different objects can be attached to the inventive collapsible leg assembly. For example, housings for various types of electronic equipment could be supported using the collapsible leg assembly. Also, while the second exemplary embodiment includes a substantially planar support surface 202 on which a piece of equipment, such as a musical keyboard, is designed to rest, it is to be understood the invention is not so limited. Rather, the collapsible leg assembly could be mounted directly to a piece of equipment, such as a musical keyboard, without using the planar support surface 202.

While exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A collapsible leg assembly configured to elevate an object above a floor surface, said collapsible leg assembly comprising:
    at least one pair of leg members, each of said leg members including an inner tubular member telescopically received within an outer tubular member; each of said inner tubular members having a first end that is pivotally coupled to said object about a respective rotational axis and a second, opposed end that is slidably disposed within an interior portion of its respective said outer tubular member, each of said outer tubular members having a first end that telescopically receives its respective said inner tubular member and a second, opposed end that is configured to be disposed proximate to said floor surface when said collapsible leg assembly is in an operative extended position;
    an attachment member operatively connecting a first of said outer tubular members to a second of said outer tubular members, thereby establishing a pivotal axis about which said leg members are capable of rotating relative to one another, said attachment member and said pivotal axis defined thereby being disposed at a fixed location along the length of each of said outer tubular members between said first and second ends thereof; and
    at least one pair of latching devices, each of said latching devices being configured to selectively prevent the relative sliding movement of one of said inner tubular members relative to its respective said outer tubular member;
    wherein said rotational axes about which said first ends of said inner tubular members pivot are spaced apart by a generally constant distance as each of said leg members of said collapsible leg assembly is moved from a collapsed position to said operative extended position; and
    wherein a first of said leg members has a first longitudinal axis extending in the lengthwise direction thereof and a second of said leg members has a second longitudinal axis extending in the lengthwise direction thereof, said first longitudinal axis being disposed generally parallel to said second longitudinal axis when said collapsible leg assembly is in a fully collapsed position.

2. The collapsible leg assembly according to claim 1, further comprising a mounting frame that includes a first elongated bracket configured to be mounted to a bottom surface of said object, a second elongated bracket laterally spaced apart from said first elongated bracket and configured to be mounted to said bottom surface of said object, and a pair of elongated rods, each having opposed longitudinal ends, and each said elongated rod being fixedly attached to said first end of a respective said inner tubular member, a first of said elongated rods being disposed between said first elongated bracket and said second elongated bracket with a respective said longitudinal end thereof being pivotably coupled to a respective said elongated bracket near a first end thereof, and a second of said elongated rods being longitudinally spaced apart from said first of said elongated rods, said second of said elongated rods being disposed between said first elongated bracket and said second elongated bracket with a respective said longitudinal end thereof being pivotably coupled to each of said elongated brackets near a second end thereof.

3. The collapsible leg assembly according to claim 2, wherein each of said first and second elongated brackets is in the form of an angle bracket and each of said opposed longitudinal ends of said elongated rods is pivotably coupled to each of said elongated angle brackets by means of a fastener attaching said longitudinal end of said elongated rod to a side of said elongated angle bracket.

4. The collapsible leg assembly according to claim 2, wherein each of said first and second elongated brackets is in the form of a channel bracket and each of said opposed longitudinal ends of said elongated rods is pivotably coupled to each of said elongated channel brackets by means of said opposed longitudinal ends of said elongated rods each being rotatably received within a respective aperture located in one side of each of said elongated channel brackets, the other, opposed side of each said elongated channel bracket being imperforate so that each of said elongated rods is laterally restrained by said elongated channel brackets.

5. The collapsible leg assembly according to claim 1, wherein each of said latching devices is disengaged when said leg assembly is in a collapsed position so that each of said leg members is capable of being extended without requiring any manipulation of said latching devices.

6. The collapsible leg assembly according to claim 5, wherein said leg assembly is capable of being extended without requiring any mechanism thereon to be released or manipulated.

7. The collapsible leg assembly according to claim 1, wherein each of said latching devices comprises an elongated strip bent at an approximately 180 degree angle, thereby forming a first strip portion that includes a detent, a second, opposed strip portion spaced apart from, and disposed generally parallel to the first strip portion, and a third strip portion having a semi-circular shape and connecting an end of the first strip portion to an end of the second strip portion, wherein each of said latching devices is configured to be released by means of a user applying a force to an outer surface of each said detent.

8. The collapsible leg assembly according to claim 1, wherein each of said latching devices is structurally configured to displace a detent inwardly so as to disengage it from an aperture in said outer tubular member in response to an axial tensile force being applied to an actuation cable or wire operatively coupled thereto.

9. A collapsible leg assembly configured to elevate an object above a floor surface, said collapsible leg assembly comprising:
- at least one pair of leg members, each of said leg members including an inner tubular member telescopically received within an outer tubular member; each of said inner tubular members having a first end that is pivotably coupled to said object and a second, opposed end that is slidably disposed within an interior portion of its respective said outer tubular member, each of said outer tubular members having a first end that telescopically receives its respective said inner tubular member and a second, opposed end that is configured to be disposed proximate to said floor surface when said collapsible leg assembly is in an operative extended position;
- an attachment member operatively connecting a first of said outer tubular members to a second of said outer tubular members, thereby establishing a pivotal axis about which said leg members are capable of rotating relative to one another, said attachment member and said pivotal axis defined thereby being disposed at a fixed location along the length of each of said outer tubular members between said first and second ends thereof; and
- at least one pair of latching devices, each of said latching devices being configured to selectively prevent the relative sliding movement of one of said inner tubular members relative to its respective said outer tubular member, and each of said latching devices including:
- an elongated strip bent at an approximately 90 degree angle, said elongated strip comprising a first strip portion that includes a detent, a second strip portion disposed at an approximately 90 degree angle with respect to said first strip portion and having an aperture disposed therein, and a third filleted strip portion connecting said first strip portion to said second strip portion;
- a sleeve fixedly attached to said elongated strip adjacent to said third filleted strip portion;
- a first rod disposed through said sleeve, the opposed longitudinal ends of said first rod being received within a first set of apertures in opposed sides of said inner tubular member;
- a second rod spaced apart from said first rod, the opposed longitudinal ends of said second rod being received within a second set of apertures in opposed sides of said inner tubular member;
- a spring having a first end and a second end, said first end of said spring being attached to said second rod so as to substantially prevent the movement thereof relative to said inner tubular member, and said second end of said spring being attached to an end of an actuation cable or wire, said actuation cable or wire passing through said aperture in said second strip portion; and
- a cable stop disposed on said actuation cable or wire proximate to the location at which said actuation cable or wire is attached to said second end of said spring;
- wherein, when an axial force is applied to said actuation cable or wire, said spring is elastically deformed and said cable stop contacts said second strip portion, thereby rotating said bent elongated strip about said first rod and releasing said detent from an aperture in said outer tubular member so as to enable the relative sliding movement of said inner tubular member relative to its respective said outer tubular member.

10. The collapsible leg assembly according to claim 1, wherein each of said latching devices comprises:
- an insert having a flanged end and one or more internal cavities circumscribed by a plurality of walls, said insert received within an interior of said inner tubular member;
- an elongated strip formed from a resilient material, said elongated strip including a detent and being affixed to an inner surface of one of said plurality of walls of said insert, said detent passing through a first aperture in said one of said plurality of walls of said insert, a second aperture in said inner tubular member, and when said latching device is in an engaged position, a third aperture in said outer tubular member; and
- an actuation cable or wire fixedly attached to said elongated strip at said detent, or proximate thereto, said actuation cable or wire being bent at an angle of between approximately 90 degrees and approximately 110 degrees within said insert and exiting said insert through a longitudinal end thereof;
- wherein, when an axial force is applied to said actuation cable or wire, said elongated strip is elastically deformed and displaced inwardly, thereby releasing said detent from said third aperture in said outer tubular member so as to enable the relative sliding movement of said inner tubular member relative to its respective said outer tubular member.

11. The collapsible leg assembly according to claim 1, wherein each of said outer tubular members comprises a plurality of apertures spaced apart along the length thereof, and each of said latching devices comprises a detent that is configured to individually engage with each of said plurality of apertures in said outer tubular member such that said leg assembly is capable of elevating said object at a plurality of predetermined heights above said floor.

12. The collapsible leg assembly according to claim 1, further comprising a cable or wire actuation system operatively coupled to each of said latching devices, said cable or wire actuation system being configured to simultaneously disengage each of said latching devices so that each of said leg members collapses in substantially the same manner.

13. The collapsible leg assembly according to claim 12, wherein said cable or wire actuation system comprises a first cable or wire operatively coupled to a first of said latching devices, a second cable or wire operatively coupled to a second of said latching devices, and a third cable or wire operatively coupled to both said first cable or wire and said second cable or wire, said third cable or wire being configured to simultaneously actuate each of said latching devices by means of said first and second cables or wires.

14. The collapsible leg assembly according to claim 1, wherein said at least one pair of leg members comprises two pairs of leg members laterally spaced apart from one another, the bottom ends of each set of said laterally spaced apart leg members both being connected to a base tubular member that is oriented substantially perpendicular to the extending directions thereof; and wherein at least one pair of latching devices comprises two pairs of latching devices, each of said latching devices being configured to selectively prevent the relative sliding movement between respective said inner and outer tubular members of each said leg member.

15. The collapsible leg assembly according to claim 14, further comprising a cable or wire actuation system operatively coupled to each of said latching devices, said cable or wire actuation system being configured to simultaneously disengage each of said latching devices so that each of said leg members collapses in substantially the same manner, said cable or wire actuation system comprising:
- a first cable or wire operatively coupled to a first of said latching devices;

a second cable or wire operatively coupled to a second of said latching devices;

a third cable or wire operatively coupled to a third of said latching devices;

a fourth cable or wire operatively coupled to a fourth of said latching devices; and a fifth cable or wire operatively coupled to said first, second, third, and fourth cables or wires, said fifth cable or wire being configured to simultaneously actuate each of said latching devices by means of said first, second, third, and fourth cables or wires.

16. The collapsible leg assembly according to claim 1, further comprising at least one pair of elongated rods, each of said elongated rods having a first end and a second end, said first end of each said elongated rod being coupled to opposed walls of a respective said inner tubular member, said second end of each said elongated rod being formed in the shape of a hook, wherein each of said elongated rods is disposed inside a respective said leg member and said hook of each said elongated rod is configured to prevent the disengagement of said inner tubular member from its respective said outer tubular member by grasping said attachment member when said second end of said inner tubular member is proximate to said first end of its respective said outer tubular member.

17. The collapsible leg assembly according to claim 1, wherein said object comprises one of the following: (i) a tabletop; (ii) a keyboard; or (iii) a housing for electronic equipment.

18. A collapsible leg assembly configured to elevate an object above a floor surface, said collapsible leg assembly comprising:

at least one pair of leg members, each of said leg members including an inner tubular member telescopically received within an outer tubular member; each of said inner tubular members having a first end with a rod that is pivotably coupled to one or more bracket members attached to said object and a second, opposed end that is slidably disposed within an interior portion of its respective said outer tubular member, each of said outer tubular members having a first end that telescopically receives its respective said inner tubular member and a second, opposed end that is configured to be disposed proximate to said floor surface when said collapsible leg assembly is in an operative extended position, wherein said second ends of said outer tubular members are not pivotally connected to a base frame and said rods at said first ends of said inner tubular members are encircled by said one or more bracket members;

an attachment member operatively connecting a first of said outer tubular members to a second of said outer tubular members, thereby establishing a pivotal axis about which said leg members are capable of rotating relative to one another, said pivotal axis passing through interior portions of said outer tubular members; and at least one pair of latching devices, each of said latching devices being configured to selectively prevent the relative sliding movement of one of said inner tubular members relative to its respective said outer tubular member;

wherein said first ends of said inner tubular members pivot about respective rotational axes, said rotational axes being spaced apart by a fixed distance which remains generally unchanged as each of said leg members of said collapsible leg assembly is moved from an extended position to a collapsed position.

19. The collapsible leg assembly according to claim 18, wherein said second ends of said inner tubular members are only slidably displaced in portions of their respective said outer tubular members between said attachment member and said first ends of their respective said outer tubular members such that said second ends of said inner tubular members are not displaced across said pivotal axis.

20. A collapsible leg assembly configured to elevate an object above a floor surface, said collapsible leg assembly comprising:

at least one pair of leg members, each of said leg members including an inner tubular member telescopically received within an outer tubular member; each of said inner tubular members having a first end that is pivotably coupled to said object and a second, opposed end that is slidably disposed within an interior portion of its respective said outer tubular member, each of said outer tubular members having a first end that telescopically receives its respective said inner tubular member and a second, opposed end that is configured to be disposed proximate to said floor surface when said collapsible leg assembly is in an operative extended position;

an attachment member operatively connecting a first of said outer tubular members to a second of said outer tubular members, thereby establishing a pivotal axis about which said leg members are capable of rotating relative to one another, said pivotal axis passing through interior portions of said outer tubular members in middle regions of their cross-sections; and at least one pair of latching devices, each of said latching devices including an elongated strip, each of said latching devices being structurally configured to displace said elongated strip inwardly so as to disengage a detent from an aperture in said outer tubular member in response to an axial force being applied to an actuation cable or wire operatively coupled thereto, and each of said latching devices being configured to selectively prevent the relative sliding movement of one of said inner tubular members relative to its respective said outer tubular member.

* * * * *